(12) United States Patent
Yu

(10) Patent No.: US 6,849,836 B2
(45) Date of Patent: *Feb. 1, 2005

(54) FLEXIBLE IMAGING MEMBER SEAM TREATMENT APPARATUS

(75) Inventor: Robert C. U. Yu, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/693,552

(22) Filed: Oct. 24, 2003

(65) Prior Publication Data

US 2004/0056014 A1 Mar. 25, 2004

Related U.S. Application Data

(62) Division of application No. 10/063,974, filed on May 30, 2002.

(51) Int. Cl.⁷ .................................................. H05B 6/10
(52) U.S. Cl. ....................................... 219/619; 219/635
(58) Field of Search ................................. 219/619, 635, 219/221, 157; 264/322, 345; 156/137, 304.6, 308.4, 64, 73.4, 73.1, 366, 359, 580.1, 57, 139, 140, 380.9

(56) References Cited

U.S. PATENT DOCUMENTS

| | | | |
|---|---|---|---|
| 3,967,997 A | | 7/1976 | Masters |
| 4,289,559 A | | 9/1981 | Murphy |
| 5,190,608 A | | 3/1993 | Darcy et al. |
| 5,549,999 A | | 8/1996 | Swain et al. |
| 5,552,005 A | * | 9/1996 | Mammino et al. .......... 156/157 |
| 5,582,949 A | | 12/1996 | Bigelow et al. |
| 6,074,504 A | * | 6/2000 | Yu et al. ..................... 156/137 |
| 6,328,922 B1 | | 12/2001 | Mishra et al. |

* cited by examiner

*Primary Examiner*—Quang T Van
(74) *Attorney, Agent, or Firm*—David E. Henn; Joseph M. Young

(57) ABSTRACT

A belt seam treatment apparatus includes a support element with a smooth surface that supports the seam region of the belt and a heat and pressure source that heats a treatment strip and the belt seam region and that forces the treatment strip against the belt seam region. The support element can be a tube over which the belt hangs and can include a vacuum belt hold system that secures the seam region against the tube during treatment. The heat and pressure source can be a heated pressure bar engaging the entire seam region or a heated pressure wheel traversing the seam region of the entire belt width.

15 Claims, 9 Drawing Sheets

FLEXIBLE IMAGING MEMBER SEAM TREATMENT APPARATUS

CROSS REFERENCE TO RELATED APPLICATIONS

This is a divisional of U.S. application Ser. No. 10/063,974, filed May 30, 2002 by the same inventors, and claims priority therefrom. This divisional application is being filed in response to a restriction requirement in that prior application.

This application is related to U.S. patent application Ser. No. 10/063,971, entitled IMPROVED FLEXIBLE IMAGING MEMBER SEAM TREATMENT, now U.S. Pat. No. 6,740,182 issued 25 May 2004. U.S. patent application Ser. No. 10/063,973, entitled FLEXIBLE IMAGING MEMBER SEAM TREATMENT ARTICLE AND PREPARATION METHOD THEREOF, and U.S. patent application Ser. No. 10/063,972, entitled FLEXIBLE IMAGING MEMBER SEAM TREATMENT APPARATUS, all filed on 30 May 2002, the disclosures of which are hereby incorporated by reference in their entirety. In addition, this application is related to U.S. patent application Ser. No. 09/428,932, filed on 28 Oct. 1999 in the names of Yu et al. and entitled SEAM STRESS RELEASE AND PROTRUSIONS ELIMINATION PROCESS, now U.S. Pat. No. 6,652,691 issued 25 Nov. 2003, the entire disclosure of which is incorporated herein by reference.

BACKGROUND AND SUMMARY

Embodiments generally relate to a seam morphological improvement approach, and, more specifically, to a post ultrasonically-welded seam overcoat treatment for flexible imaging member belts.

Flexible electrostatographic belt imaging members are well known in the art. Typical electrostatographic flexible belt imaging members include, for example, photoreceptors for electrophotographic imaging systems, electroreceptors such as ionographic imaging members for electrographic imaging systems, and intermediate image transfer belts for transferring toner images in electrophotographic and electrographic imaging systems. These belts are usually formed by cutting a rectangular, a square, or a parallelogram shape sheet from a web containing at least one layer of thermoplastic polymeric material, overlapping opposite ends of the sheet, and joining the overlapped ends together to form a welded seam. The seam extends from one edge of the belt to the opposite edge. Generally, these belts comprise at least a supporting substrate layer and at least one imaging layer comprising thermoplastic polymeric matrix material. The imaging layer as employed herein is defined as and refers to any of the dielectric imaging layer of an electroreceptor belt, the transfer layer of an intermediate transfer belt, and the charge transport layer of an electrophotographic belt. Thus, the thermoplastic polymeric matrix material in the imaging layer is generally located in the upper portion of a cross section of an electrostatographic imaging member belt, the substrate layer being in the lower portion of the cross section of the electrostatographic imaging member belt. Although the flexible belts of interest include the mentioned types, for simplicity reasons, the discussion hereinafter will be focus on the electrophotographic imaging member belts.

Between the substrate and imaging layers, such flexible electrophotographic imaging members or multilayered photoreceptors also typically include an electrically conductive layer, an optional hole blocking layer, an adhesive layer, a charge generating layer, and, in some embodiments, an anti-curl backing layer. One type of multilayered photoreceptor comprises a layer of finely divided particles of a photoconductive inorganic compound dispersed in an electrically insulating organic resin binder to form a layer that is charge generating and charge transporting. A typical layered photoreceptor having separate charge generating (photogenerating) and charge transport layers is described in U.S. Pat. No. 4,265,990, the entire disclosure thereof being incorporated herein by reference. In negatively-charged varieties of such photoreceptors, a charge generating layer is capable of photogenerating holes and injecting the photogenerated holes into the charge transport layer.

Although excellent toner images can be obtained with multilayered belt photoreceptors, it has been found that as more advanced, higher speed electrophotographic copiers, duplicators and printers are developed, fatigue-induced cracking of the charge transport layer at the welded seam area is frequently encountered during photoreceptor belt cycling. Moreover, the onset of seam cracking has also been found to rapidly lead to seam delamination due to fatigue, shortening belt service life. Dynamic fatigue seam cracking can possibly happen in ionographic imaging member belts as well.

As mentioned above, flexible electrostatographic imaging members are typically fabricated from a sheet cut from an imaging member web, generally in a rectangular or parallelogram shape, and a sheet is formed into a belt by joining overlapping opposite marginal end regions of the sheet. A seam is typically produced in the overlapping marginal end regions at the point of joining. Joining can be effected by any suitable means, such as by welding (including ultrasonic), gluing, taping, pressure heat fusing, and the like. Ultrasonic welding is generally the preferred method of joining because it is rapid, clean (no solvents), and produces a thin and narrow seam. In addition, ultrasonic welding is preferred because the mechanical pounding of the welding horn causes generation of heat at the contiguous overlapping end marginal regions of the sheet to maximize melting of one or more layers therein. A typical ultrasonic welding process is carried out by holding down the overlapped ends of a flexible imaging member sheet with vacuum against a flat anvil surface and guiding the flat end of an ultrasonic vibrating horn transversely across the width of the sheet, over and along the length of the overlapped ends, to form a welded seam.

When ultrasonically welded into a belt, the seam of multilayered electrophotographic imaging flexible members can occasionally contain undesirable high protrusions such as peaks, ridges, spikes, and mounds. These seam protrusions present problems during image cycling of the belt machine because they interact with cleaning blades to cause blade wear and tear, which ultimately affects cleaning blade efficiency and service life. Moreover, the protrusion high spots in the seam can also interfere with the operation of subsystems of copiers, printers and duplicators by damaging electrode wires used in development subsystems that position the wires parallel to and closely spaced from the outer imaging surface of belt photoreceptors. These closely spaced wires are employed to facilitate the formation of a toner powder cloud at a development zone adjacent to a toner donor roll and the imaging surface of the belt imaging member. Another frequently observed mechanical failure in the imaging belts during image cycling is that, after being subjected to extended bending and flexing cycles over small diameter belt support rollers, the ultrasonically welded seam of an electrophotographic imaging member can develop cracks that propagate and lead to delamination of the belt.

Additionally, such cracking and delamination can result from lateral forces caused by mechanical rubbing contact against stationary web edge guides of a belt support module during cycling. Seam cracking and delamination is further aggravated when the belt is employed in electrophotographic imaging systems utilizing blade cleaning devices and some operational imaging subsystems. Alteration of materials in the various photoreceptor belt layers such as the conductive layer, hole blocking layer, adhesive layer, charge generating layer, and/or charge transport layer to suppress cracking and delamination problems is not easily accomplished. The alteration of the materials can adversely impact the overall physical, electrical, mechanical, and other properties of the belt such as well as coating layer uniformity, residual voltage, background, dark decay, flexibility, and the like.

As mentioned above, when a flexible imaging member used in an electrophotographic machine is a photoreceptor belt fabricated by ultrasonic welding of overlapped opposite ends of a sheet, the ultrasonic energy transmitted to the overlapped ends melts the thermoplastic sheet components in the overlap region to form a seam. The ultrasonic welded seam of a multilayered photoreceptor belt is relatively brittle and low in strength and toughness. The joining techniques, particularly the welding process, can result in the formation of a splashing that projects out from either side of the seam in the overlap region of the belt. The overlap region and splashings on each side of the overlap region comprise a strip from one edge of the belt to the other that is referred herein as the seam region. The seam region of a typical overlap seamed flexible belt is about 1.6 times thicker than the thickness of the body of the belt. Because of the splashing, a typical flexible imaging member seamed belt has a peak splashing height of about 76 micrometers above the surface of the imaging layer at the junction between the top splashing and the surface of the belt. The junction meeting point is the undesirable site of physical discontinuity which has been found to act as a stress concentration point that facilitates early onset of seam cracking/delamination under the dynamic fatigue-inducing conditions to which imaging members are subjected in normal use.

The photoreceptor belt in an electrophotographic imaging apparatus undergoes bending strain as the belt is cycled over a plurality of support and drive rollers. The excessive thickness of the photoreceptor belt in the seam region due to the presence of the splashing results in a large induced bending strain as the seam travels over each roller. Generally, small diameter support rollers are highly desirable for simple, reliable copy paper stripping systems in electrophotographic imaging apparatus utilizing a photoreceptor belt system operating in a very confined space. Unfortunately, small diameter rollers, e.g., less than about 0.75 inch (19 millimeters) in diameter, raise the threshold of mechanical performance criteria to such a high level that photoreceptor belt seam failure can become unacceptable for multilayered belt photoreceptors. For example, when bending over a 19 millimeter diameter roller, a typical photoreceptor belt seam splashing can develop a 0.96 percent tensile strain due to bending. This is 1.63 times greater than a 0.59 percent induced bending strain that develops within the rest of the photoreceptor belt. Therefore, the 0.96 percent tensile strain in the seam splashing region of the belt represents a 63 percent increase in stress placed upon the seam splashing region of the belt.

Under dynamic fatiguing conditions, the seam provides a focal point for stress concentration and becomes the point of crack initiation which is further developed into seam delamination causing premature mechanical failure in the belt. Thus, the splashing tends to shorten the mechanical life of the seam and service life of the flexible member belts used in copiers, duplicators, and printers.

Although a solution to suppress the seam cracking/delamination problems has been successfully demonstrated, as described in a prior art, by a specific heat treatment process of a flexible electrophotographic imaging member belt with its seam parked directly on top of a 19 mm diameter back support rod for stress-releasing treatment at a temperature slightly above the glass transition temperature (Tg) of the charge transport layer of the imaging member, nevertheless this seam stress release process was also found to produce various undesirable effects such as causing seam area imaging member set and development of belt ripples in the active electrophotographic imaging zones of the belt (e.g., the region beyond about 25.2 millimeters from either side from the midpoint of the seam). Moreover, the heat treatment can induce undesirable circumferential shrinkage of the imaging belt. The set in the seam area of an imaging member mechanically adversely interacts with the cleaning blade and impacts cleaning efficiency. The ripples in the imaging member belt manifest themselves as copy printout defects. Further, the heat induced imaging belt dimensional shrinkage alters the precise dimensional specifications required for the belt. Another key shortcoming associated with the prior art seam stress release heat treatment process is the extensive heat exposure of a large seam area. This extensive heat exposure heats both the seam area of the belt as well as the rod supporting the seam. Since the belt must be cooled to below the glass transition temperature of the thermoplastic material in the belt prior to removal from the support rod to produce the desired degree of seam stress release in each belt, the heat treatment and cooling cycle time is unduly long and leads to very high belt production costs. Additionally, such seam heat treatment stress-release processing does not produce the desired seam surface smoothing and protrusion spot elimination.

Since there is no effective way to prevent the generation of localized high protrusions at the seam, imaging member belts are inspected, right after seam welding belt production process, manually by hand wearing a cotton glove through passing the index finger over the entire seam length and belts found catching the glove by the protrusions are identified as production rejects. Both the time consuming procedure of manual inspection and the number of seamed belts rejected due to the presence of high seam protrusions constitute a substantial financial burden on the production cost of imaging members.

The following references may be of interest:

U.S. Pat. No. 5,190,608, issued 2 Mar. 1993 to Darcy et al., discloses a flexible belt having an outwardly facing surface, a welded seam having irregular protrusion on the outwardly facing surface and a thin flexible strip laminated and covering the welded seam and protrusions. This belt can be fabricated by providing a flexible belt having an outwardly facing surface and a welded seam having irregular protrusions on the outwardly facing surface and laminating a thin flexible strip to the welded seam. The belt can be used in an electrostatographic imaging process.

U.S. Pat. No. 5,549,999, issued 27 Aug. 1996 to Swain et al, discloses a process for coating flexible belt seams including providing a flexible belt having an outwardly facing surface and a welded seam, forming a smooth liquid coating comprising a hardenable film forming polymer on the welded seam, the coating being substantially free of fugitive solvent, and hardening the coating to form a smooth solid coating on the seam.

U.S. Pat. No. 5,582,949, issued 10 Dec. 1996 to Bigelow et al, discloses a process for coating flexible belt seams including providing a flexible belt having an outwardly facing surface and a welded seam, forming a smooth liquid coating on the welded seam, the liquid coating comprising a film forming polymer and a fugitive liquid carrier in which the belt surface is substantially insoluble, and removing the fugitive liquid carrier to form a smooth solid coating on the seam.

U.S. Pat. No. 6,328,922 B1, issued 11 Dec. 2001 to Mishra et al, discloses a process for post treatment of an imaging member belt including providing a support member having a smooth flat surface, proving a flexible belt having a welded seam, supporting the inner surface of the seam on the smooth flat surface, contacting the seam with a heated surface, heating the seam region with the heated surface to raise the temperature in the seam region to a temperature of from about 2° C. to 20° C. about the $T_g$ of the thermoplastic polymer material, and compressing the seam with the heated surface with sufficient compression pressure to smooth out the seam.

U.S. Pat. No. 5,552,005, issued 3 Sep. 1996 to Mammino et al, discloses a flexible imaging sheet and a method of constructing a flexible imaging sheet. The method of constructing a flexible imaging sheet comprises overlapping, joining, and shaping first and second marginal end regions of a sheet to form an overlap region and a non-overlap region joined to one another by a seam in the overlap region with a generally planar surface co-planar with a surface of the non-overlap region. The first and second marginal end regions are secured to one another in the overlap region by the seam, and are substantially co-planar to minimize stress on the flexible imaging sheet. Minimization of stress concentration, resulting from dynamic bending of the flexible imaging sheet during cycling over a roller within an electrophotographic imaging apparatus, is particularly accomplished in the present invention.

U.S. Pat. No. 6,074,504 to Yu et al, issued 13 Jun. 2000, discloses a process for treating a seamed flexible electrostatographic imaging belt including providing an imaging belt having two parallel edges, the belt comprising at least one layer comprising a thermoplastic polymer matrix and a seam extending from one edge of the belt to the other, the seam having an imaginary centerline, providing an elongated support member having at arcuate supporting surface and mass, the arcuate surface having at least a substantially semicircular cross section having a radius of curvature of between about 9.5 millimeters and about 50 millimeters, supporting the seam on the arcuate surface with the region of the belt adjacent each side of the seam conforming to the arcuate supporting surface of the support member, precisely traversing the length of the seam from one edge of the belt to the other with thermal energy radiation having a narrow Gaussian wavelength distribution of between about 10.4 micrometers and about 11.2 micrometers emitted from a carbon dioxide laser, the thermal energy radiation forming a spot straddling the seam during traverse, the spot having a width of between about 3 millimeters and about 25 millimeters measured in a direction perpendicular to the imaginary centerline of the seam, and rapidly quenching the seam by thermal conduction of heat from the seam to the mass of the support member to a temperature below the glass transition temperature of the polymer matrix while the region of the belt adjacent each side of the seam conforms to the arcuate supporting surface of the support member.

While these and other innovative prior art approaches provided improved flexible belt seam morphology, nevertheless it has been found that solution of one problem has also created new undesirable issues. For example, overcoating the seam of a photoreceptor belt with metallic foil can cause electrical seam arcing as the belt cycles beneath a charging device during electrophotographic imaging processes. Additionally, application of liquid overcoating layer over the seam induced charge transport molecule crystallization in the vicinity of the seam overcoat, not to mention that liquid overcoating layer can produce poor adhesion bond strength to the seam after solidification into a dried coat. Thus, there is a continuing need for electrostatographic imaging belts having improved welded seam design that is resistant to seam cracking/delamination, substantially free of seam protrusions, has improved seam region physical continuity, and is substantially free of factors that damage imaging subsystems.

Furthermore, there is an urgent need to provide seamed flexible imaging belts with an improved seam morphology which can withstand greater dynamic fatigue conditions thereby extending belt service life. It is also important, from the imaging member belt production point of view, that effective cutting of unit manufacturing cost of seamed imaging belts can be realized if an innovative post seaming treatment process can be developed and adopted for belt finishing implementation to provide the improvement of morphological seam surface smoothing free of protrusion spots and to effect the elimination of physical discontinuity at the junction meeting point where the top seam splashing making contact with the belt surface.

Embodiments of the instant invention provide such an improved electrostatographic imaging member that substantially overcomes the above-noted deficiencies by providing a morphologically improved seamed electrostatographic imaging member. Embodiments yield an improved electrostatographic imaging member with an ultrasonically welded seam which, after being subjected to post processing, exhibits greater resistance to onset of dynamic fatigue induced seam cracking/delamination problem. After being subjected to post processing according to embodiments, seams exhibit good circumferential dimension tolerance, robust mechanical seam function, and reduced cleaning blade wear. Seams treated according to embodiments are substantially free of seam protrusions, have smoother surface morphological profiles, have little or no seam region physical discontinuity, and have reduced seam area thickness that greatly reduces seam region bending stress when the electrostatographic imaging member flexes over small-diameter belt module support rollers.

These results are achieved according to embodiments by, for example, providing a flexible belt seam treatment apparatus comprising a support element with a smooth surface arranged to support a belt seam region, a belt hold system that holds the belt seam region against the support element, and a heated pressure element arranged to heat and force a belt seam region against the support element. The smooth surface supporting the belt can be substantially flat or curved, and can have an abhesive coating, such as a fluoropolymer. The heated pressure element can comprise a heated pressure bar, preferably exerting from about 70 lbs/in$^2$ to about 770 lbs/in$^2$ compression force or can comprise a heated pressure wheel, preferably exerting from about 1 lb/in to about 20 lb/in line contact force. The heated pressure element can be heated by a resistance heating element, electromagnetic induction, or any other suitable heating system, and can include an abhesive coating.

Such results can also be achieved according to embodiments by, for example, providing a flexible belt seam treatment apparatus comprising a support element with a smooth surface arranged to support a belt seam region, and a heat and pressure source arranged to heat a treatment strip applied to the belt seam region to a temperature falling in a range of from about 20° C. to about 70° C. above a glass transition temperature of at least one of a thermoplastic polymer of the treatment strip and a thermoplastic polymer of the belt seam region, and further arranged to exert a compression contact force on the treatment strip. The heat and pressure source can be a heated pressure bar that exerts, for example, from about 70 lbs/in$^2$ to about 770 lbs/in$^2$ compression force on the treatment strip, and, when the support element is tubular, the heated pressure bar can have a contact surface substantially corresponding to at least an arcuate portion of the support element's surface. Alternatively, the heat and pressure source can be a heated pressure wheel that exerts, for example, from about 1 lb/in to about 20 lb/in line contact force on the treatment strip, and, when the support element is tubular, the heated pressure wheel can have a contact surface substantially corresponding to at least an arcuate portion of the support element's surface. An electromagnetic induction system, a resistive heating element, or any other suitable heat source can act as the heat and pressure source.

Such results can further be achieved according to embodiments by, for example, providing a flexible belt seam treatment apparatus comprising a tube with a smooth, abhesive outer surface, a belt hold system arranged to hold a seam region of a belt against at least a portion of the outer surface of the tube, and a heated pressure element with a substantially concave outer surface substantially corresponding to a curvature of the at least a portion of the outer surface of the tube against which the seam region of the belt is held. The heated pressure element can be a heated pressure wheel moved by an actuator across a width of the seam region, or the heated pressure element can be a heated pressure bar that selectively engages an entire width of the seam region in response to an actuator that moves the heated pressure bar into engagement with the seam region when the seam region is held against the tube. The belt hold system can comprise a vacuum system including at least one opening in the outer surface of the tube, a sealed end of the tube, and an unsealed end of the tube in selective fluid communication with a vacuum source, or can comprise a bar that extends through a portion of the belt farthest from the tube and selectively pulls the belt against the tube, either in response to an actuator that selectively exerts force on the belt to pull the belt against the tube, or in response to an operator that places the bar in the belt so that the bar pulls the belt through the action of gravity on the bar.

Although this invention deals with the seam overcoat material formulations, it also relates to apparatus and lamination process for effective flexible electrostatographic imaging member belts seam overcoating application, the following will focus only on seamed flexible electrophotographic imaging member belts to simplify discussion.

A more complete understanding of the process and apparatus of the present invention can be obtained by reference to the accompanying drawings wherein:

BRIEF DESCRIPTION OF DRAWINGS

In the detailed description, reference is made to the accompanying drawings, in which.

Figure 1:
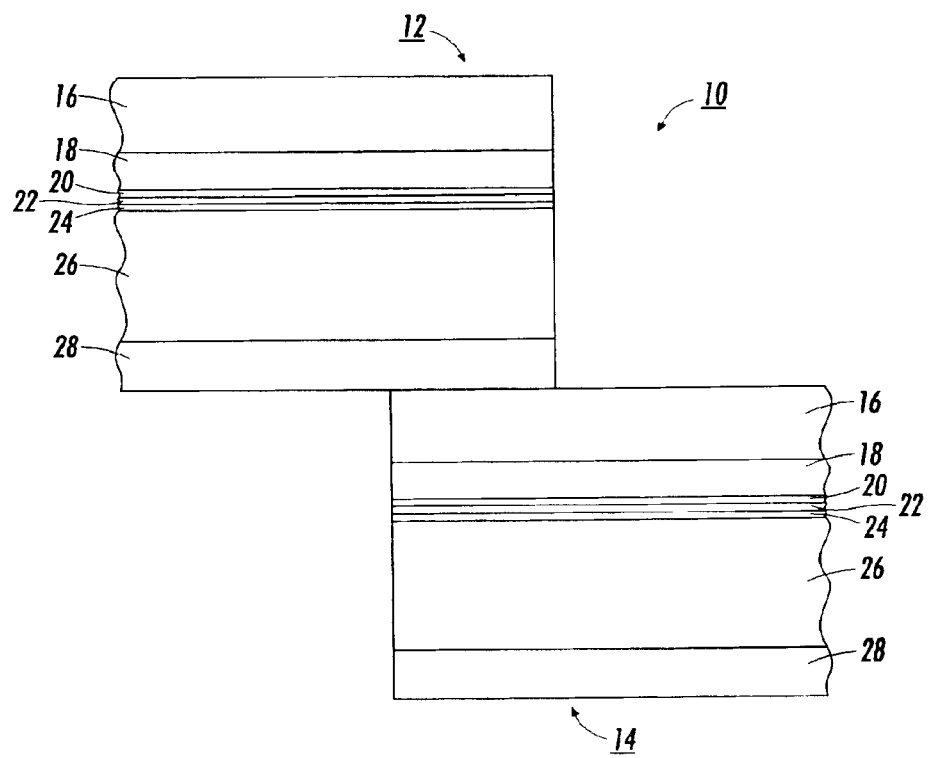
FIG. 1 illustrates a schematic partial cross-sectional view of a multiple layered flexible sheet of electrophotographic imaging member material with opposite ends overlapped.

In the drawings and the following description below, it is to be understood that like numeric designations refer to components of like function.

DETAILED DESCRIPTION

Although specific terms are used in the following description for the sake of clarity, these terms are intended to refer only to the exemplary embodiment selected for illustration in the drawings, and are not intended to define or limit the scope of the invention.

Referring to FIG. 1, there is illustrated a flexible electrophotographic imaging member 10 in the form of a belt formed from a sheet having a first end marginal region 12 overlapping a second end marginal region 14 to form an overlap region ready for a seam forming operation. The flexible electrophotographic member 10 can be used within an electrophotographic imaging device and can be a single film substrate member or a member having a film substrate layer combined with one or more additional coating layers. At least one of the coating layers comprises a film forming binder.

The flexible electrophotographic imaging member 10 can be a single layer or comprise multiple layers. If the flexible electrophotographic imaging member 10 is to be a negatively charged photoreceptor device, the flexible electrophotographic imaging member 10 may comprise a charge generator layer sandwiched between a conductive surface and a charge transport layer. Alternatively, if the flexible imaging member 10 is to be a positively charged photoreceptor device, the flexible imaging member 10 may comprise a charge transport layer sandwiched between a conductive surface and a charge generator layer.

The layers of the flexible electrophotographic imaging member 10 can comprise numerous suitable materials having suitable mechanical properties. Examples of typical layers are described in U.S. Pat. No. 4,786,570, U.S. Pat. No. 4,937,117, and U.S. Pat. No. 5,021,309, the entire disclosures of which are incorporated herein by reference. The flexible electrophotographic imaging member 10 of embodiments shown in FIG. 1 comprises, from top to bottom, a charge transport layer 16, a generator layer 1, an interface layer 20, a blocking layer 22, a conductive ground plane layer 24, a supporting layer 26, and an anti-curl back coating layer 28. It should be understood that the thicknesses of the layers are conventional and that a wide range of thicknesses can be used for each of the layers.

Figure 2:
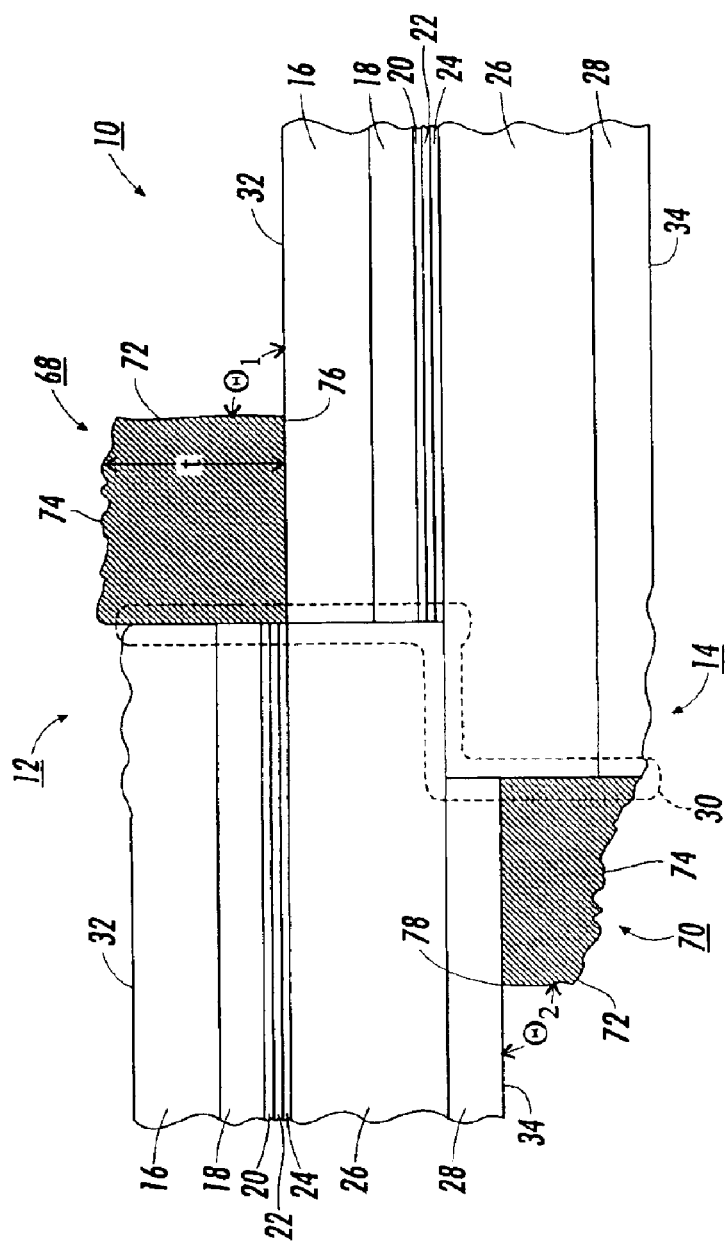
FIG. 2 shows a schematic partial cross-sectional view of a multiple layered seamed flexible electrophotographic imaging member belt derived from the sheet illustrated in FIG. 1 after ultrasonic seam welding.

The end marginal regions 12 and 14 can be joined by any suitable means including gluing, taping, stapling, pressure and heat fusing to form a continuous member such as a belt, sleeve, or cylinder. However, for ease of belt fabrication, short operation cycle time, and the mechanical strength of the fabricated joint, embodiments employ an ultrasonic welding process to join the end marginal regions 12 and 14 into a seam 30 in the overlap region, as shown in FIG. 2, to form a seamed flexible electrophotographic imaging member 10 in the form of a belt. In the ultrasonic seam welding process, ultrasonic energy applied to the overlap region is used to melt suitable layers such as the charge transport layer 16, generator layer 18, interface layer 20, blocking layer 22, part of the support layer 26 and/or anti-curl back coating layer 28. Direct fusing of the support layer achieves optimum seam strength.

Figure 3:
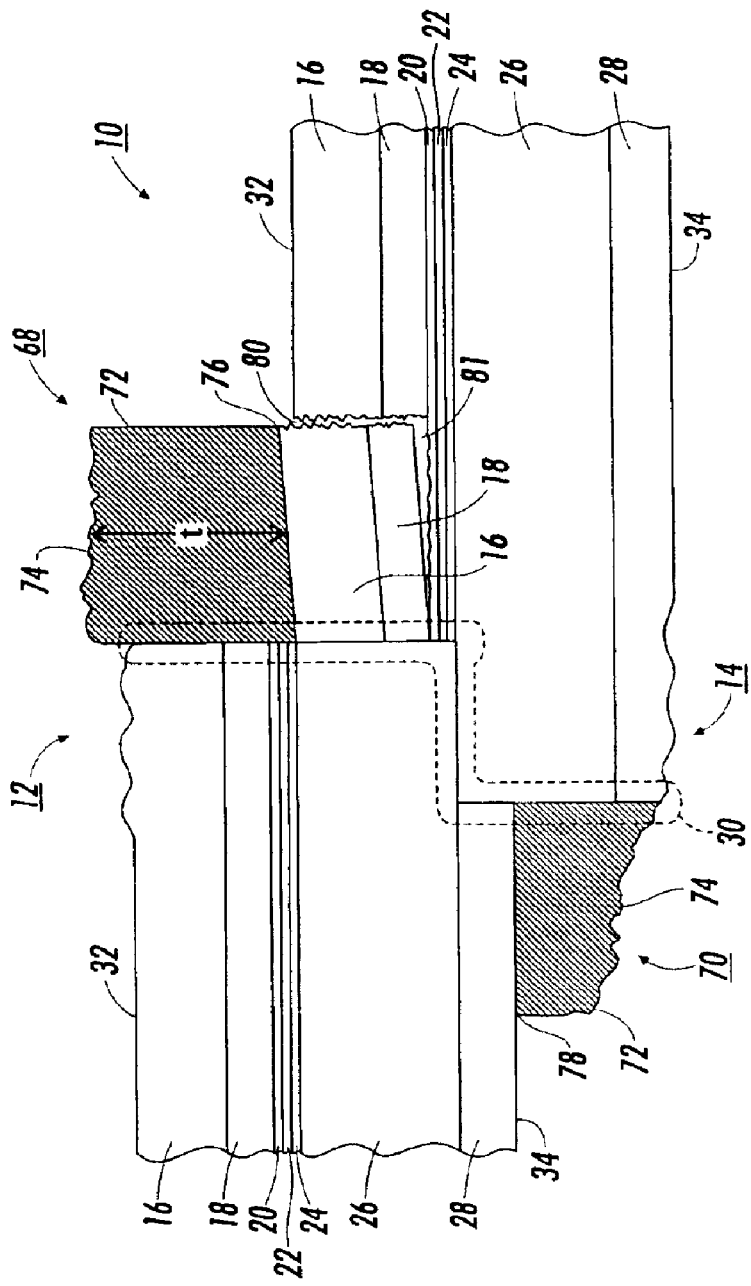
FIG. 3 illustrates a schematic partial cross-sectional view of a multiple layered seamed flexible electrophotographic imaging member belt which has mechanical failure due to fatigue induced seam cracking/delamination problem.

Upon completion of welding the overlap region of the flexible electrophotographic imaging member sheet into a seam 30 using ultrasonic seam welding technique, the overlap region is transformed into an overlapping and abutting region as illustrated in FIGS. 2 and 3. Within the overlapping and abutting region, the portions of the flexible electrophotographic imaging member 10, which once formed the end marginal regions 12 and 14, are joined by the seam 30 such that the once end marginal regions 12 and 14 are overlapping and abutting one another. The seam 30, indicated by a dashed line in FIG. 2, comprises two vertical portions joined by a horizontal portion. The midpoint of seam 30 can be represented by an imaginary centerline extending the length of seam 30 from one edge of belt 10 to the opposite edge, the imaginary centerline (not shown) running along the middle of the horizontal portion which joins the two vertical portions illustrated in FIG. 2. In other words, a plan view (not shown) of the horizontal portion of seam 30 would show a strip much like a two lane highway in which the centerline would be represented by the white divider line separating the two lanes, the two lanes comprising end marginal regions 12 and 14. The flexible electrophotographic imaging member 10 has a first major exterior surface or side 32 and a second major exterior surface or side 34 on the opposite side. The seam 30 joins the flexible electrophotographic imaging member 10 so that, the bottom surface 34 at and/or near the first end marginal region 12 is integral with the top surface 32 at and/or near the second end marginal region 14. Generally, the bottom surface 34 includes at least one layer immediately above the bottom of the belt in the first end marginal region 12, and the top surface 32 includes including at east one layer immediately below the top of the belt in the second end marginal region 14.

Figure 4:
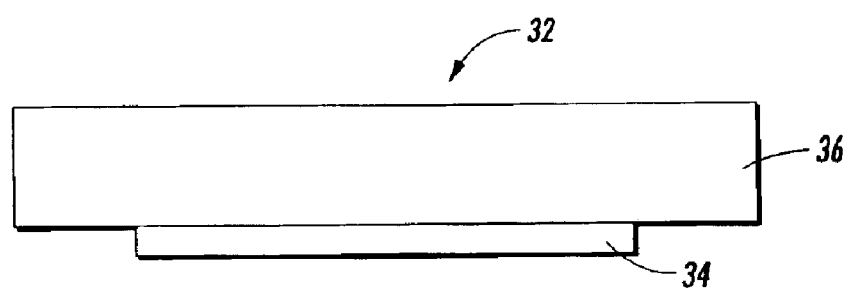
FIG. 4 shows the cross sectional side view of a strip laminator consisting of a thin thermoplastic polymer laminate lightly adhering over a flexible carrier backing substrate layer readily for use in invention seam overcoating application.

The welded seam 30 in embodiments also contains upper and lower splashings 68 and 70 at each end thereof as illustrated in FIGS. 2 and 4. The splashings 68 and 70 are formed in the process of joining the end marginal regions 12 and 14 together when molten material is necessarily ejected from either side of the overlap region to facilitate direct support-layer-to-support-layer fusing. The upper splashing 68 is formed and positioned above the overlapping end marginal region 14, abutting the top surface 32 and adjacent to and abutting the overlapping end marginal region 12. The lower splashing 70 is formed and positioned below the overlapping end marginal region 12, abutting bottom surface 34 and adjacent to and abutting the overlapping end marginal region 14. The splashings 68 and 70 extend beyond the sides and the edges of the seam 30 in the overlap region of the welded flexible electrophotographic imaging member 10. The extension of the splashings 68 and 70 beyond the sides and the edges of the seam 30 is undesirable for many machines such as electrophotographic copiers, duplicators, and other such machines that require precise edge positioning of a flexible electrophotographic imaging member 10 during machine operation. Generally, the extension of the splashings 68 and 70 at the belt edges of the flexible electrophotographic imaging member 10 are removed by a notching operation.

A typical upper splashing 68 has a height or thickness t of about 90 micrometers and projects about 17 microns above the surface of the overlapping end marginal region 12. Each of the splashings 68 and 70 has an uneven, but generally rectangular, shape including one side 72, a free side that forms a free end, extending inwardly toward top surface 32 from an outwardly facing side 74, which extends substantially parallel to either the top surface 32 or the bottom surface 34. The free side 72 of the splashing 68 forms an approximately perpendicular angle $\theta_1$ with the bottom surface 34 of the flexible electrophotographic imaging member 10 at a junction 76. Likewise, the free side 72 of the splashing 70 forms an approximately perpendicular angle $\theta_2$ at a junction 78 of the free side 72 of the lower splashing 70 and the bottom surface 34 of the flexible imaging member 10. Both junctions 76 and 78 create focal points for stress concentration and become initial points of failure affecting the mechanical integrity of the flexible electrophotographic imaging member 10.

During machine operation, the seamed flexible electrophotographic imaging member 10 cycles or bends over rollers, particularly small diameter rollers, of a belt support module within an electrophotographic imaging apparatus. As a result of dynamic bending/flexing of the flexible electrophotographic imaging member 10 during cycling, the rollers repeatedly exert a force on the flexible imaging member 10 that causes large stresses to develop generally adjacent to the seam 30 due to the excessive thickness and material discontinuity thereof. The stress concentrations that are induced by bending near the junction points 76 and 78 can reach values much larger than the average value of the stress over the entire length of the flexible electrophotographic imaging member 10. The induced bending stress is inversely related to the diameters of a roller that the flexible imaging member 10 bends over and directly related to the thickness of the seam 30 of the flexible electrophotographic imaging member belt 10. When a structural member, such as the flexible electrophotographic imaging member 10, contains a sudden increase in cross-sectional thickness at the overlap region, high localized stress occurs near the discontinuity, e.g. junction points 76 and 78.

When the flexible electrophotographic imaging member 10 bends over the rollers of a belt module within an electrophotographic imaging apparatus, the bottom surface 34 of the flexible electrophotographic imaging member 10, which is adapted to contact the exterior surface of the roller, is compressed. In contrast, the top surface 32 is stretched under tension. This is attributable to the fact that the top surface 32 and bottom surface 34 move in a circular path about the circular roller. Since the top surface 32 is at greater radial distance from the center of the circular roller than the bottom surface 34, the top surface 32 must travel a greater distance than the bottom surface 34 in the same time period. Therefore, the top surface 32 must be stretched under tension relative to a generally central portion of the flexible electrophotographic imaging member 10 (the portion of the flexible electrophotographic imaging member 10 generally extending along the center of gravity of the flexible imaging member 10). Likewise, the bottom surface 34 must be compressed relative to the generally central portion of the flexible imaging member 10 (the portion of the flexible electrophotographic imaging member 10 generally extending along the center of gravity of the flexible electrophotographic imaging member 10). Consequently, the bending stress at the junction point 76 will be tension stress, and the bending stress at the junction point 78 will be compression stress.

Compression stresses, such as at the junction point 78, rarely cause seam 30 failure. Tension stresses, such as at junction point 76, however, are much more of a problem. The tension stress concentration at the junction point 76 in great likelihood will eventually result in crack initiation through the electrically active layers of the flexible electrophotographic imaging member 10 as illustrated in FIG. 3. The illustrated crack 80 is adjacent to the top splashing 68 of the second end marginal region 14 of the flexible electrophotographic imaging member 10. The generally vertically extending crack 80 initiated in the charge transport layer 16 continues to propagate through the generator layer 18. Inevitably, the crack 80 extends generally horizontally to develop seam delamination 81 which is propagated through the relatively weak adhesion bond between the adjoining surfaces of the generator layer 18 and the interface layer 20.

The formation of the local seam delamination 81 is typically called seam puffing. The excess thickness of the splashing 68 and stress concentration at the junction 76 causes the flexible electrophotographic imaging member 10 to perform, during extended machine operation, as though a material defect existed therein. Thus, the splashing 68 tends to promote the development of dynamic fatigue failure of the seam 30 and can lead to separation of the joined end marginal regions 12 and 14 severing the flexible imaging member 10. Consequently, the service life of the flexible imaging member 10 is shortened.

In addition to seam failure, the crack 80 acts as a depository site and collects toner, paper fibers, dirt, debris, and other unwanted materials during electrophotographic imaging and cleaning of the flexible electrophotographic imaging member 10. For example, during the cleaning process, a cleaning instrument, such as a cleaning blade, will repeatedly pass over the crack 80. As the site of the crack 80 becomes filled with debris, the cleaning instrument dislodges at least some portion of this highly concentrated level of debris from the crack 80. The amount of the debris, however, is beyond the removal capacity of the cleaning instrument, and portions of the highly concentrated debris are deposited onto the surface of the flexible electrophotographic imaging member 10. In effect, the cleaning instrument spreads the debris across the surface of the flexible electrophotographic imaging member 10 instead of removing the debris therefrom.

In addition to seam failure and debris spreading, the portion of the flexible member 10 above the seam delamination 81, in effect, becomes a flap which moves upwardly. The upward movement of the flap presents an additional problem during the cleaning operation. The flap becomes an obstacle in the path of the cleaning instrument as the instrument travels across the surface of the flexible electrophotographic imaging member 10. The cleaning instrument eventually strikes the flap when the flap extends upwardly. As the cleaning instrument strikes the flap, great force is exerted on the cleaning instrument which can lead to damage thereof, e.g., excessive wear and tearing of the cleaning blade.

In addition to damaging the cleaning blade, the striking of the flap by the cleaning instrument causes unwanted vibration in the flexible electrophotographic imaging member 10. This unwanted vibration adversely affects the copy/print quality produced by the flexible electrophotographic imaging member 10. The copy/print is affected because imaging occurs on one part of the flexible imaging member 10 simultaneously with the cleaning of another part of the flexible imaging member 10.

To overcome the problems associated with seam cracking and delamination, embodiments employ a seam treatment article, treatment strip, or laminator strip 32 applied in a strip to the seam region in a particular fashion. A laminator strip 32 according to embodiments, shown, for example, in cross-section in FIG. 4, comprises a film or thin laminate 34 adhering to a flexible backing substrate layer 36. Embodiments employ a thickness of the laminate 34 of between about 5 micrometers and about 50 micrometers; particularly, good results can be achieved with a thickness of between about 10 micrometers and about 30 micrometers.

Laminate 34 is a film-forming thermoplastic polymer that, in embodiments, is substantially identical or substantially compatible with (compatible means it can form polymer blend) the polymer binder of the charge transport layer of the flexible imaging member. In this context, compatible means that the thermoplastic polymer film 34 can form a polymer blend with the polymer binder of the charge transport layer. Alternatively, embodiments can employ a laminate 34 that is a polymer blend of the polymer binder and a film-forming thermoplastic polymer. In addition, the laminate 34 of embodiments can contain organic charge transport molecule of the same kind or of a different kind as that of the charge transport layer. The laminate 34 of embodiments can have a width of from about 2 mm to about 15 mm, but can yield better results with a width of between about 3 and about 10 mm. The laminate 34 must be compressible and malleable under the heat and compression processing conditions to enable bonding to the seam and facilitate filling the physical discontinuities of the seam.

Although the flexible backing substrate layer 36 can be a metallic foil or a high glass transition temperature ($T_g$) flexible polymer substrate, use of a polymer substrate that is substantially not affected by the heat and compression of embodiments is preferred. Materials such as polyethylene terephthalate (PET, also known as Mylar), polyethylene naphthalate (Kadelex), polyimide (Kapton), and the like meet such requirements and can be used in embodiments. A thickness of between about 2 mils and about 5 mils is satisfactory in embodiments, and a width equal to the width of the laminate can be employed, with even better seam overcoating/lamination results achieved in embodiments having a substrate about 2 to about 5 mm wider on each side of the laminate 34. The laminate 34 preferably has, in embodiments, an 180° adhesion peel strength over the backing substrate layer 36 of between about 3 g/cm and about 8 g/cm to ensure that the substrate can be readily stripped off of the overcoat after completion of the treatment process. Although in embodiments the laminator strip 32 is preferred to be a dual-layer strip as illustrated in FIG. 4, it can also be just a single laminate layer 34 if desired.

Figure 5:
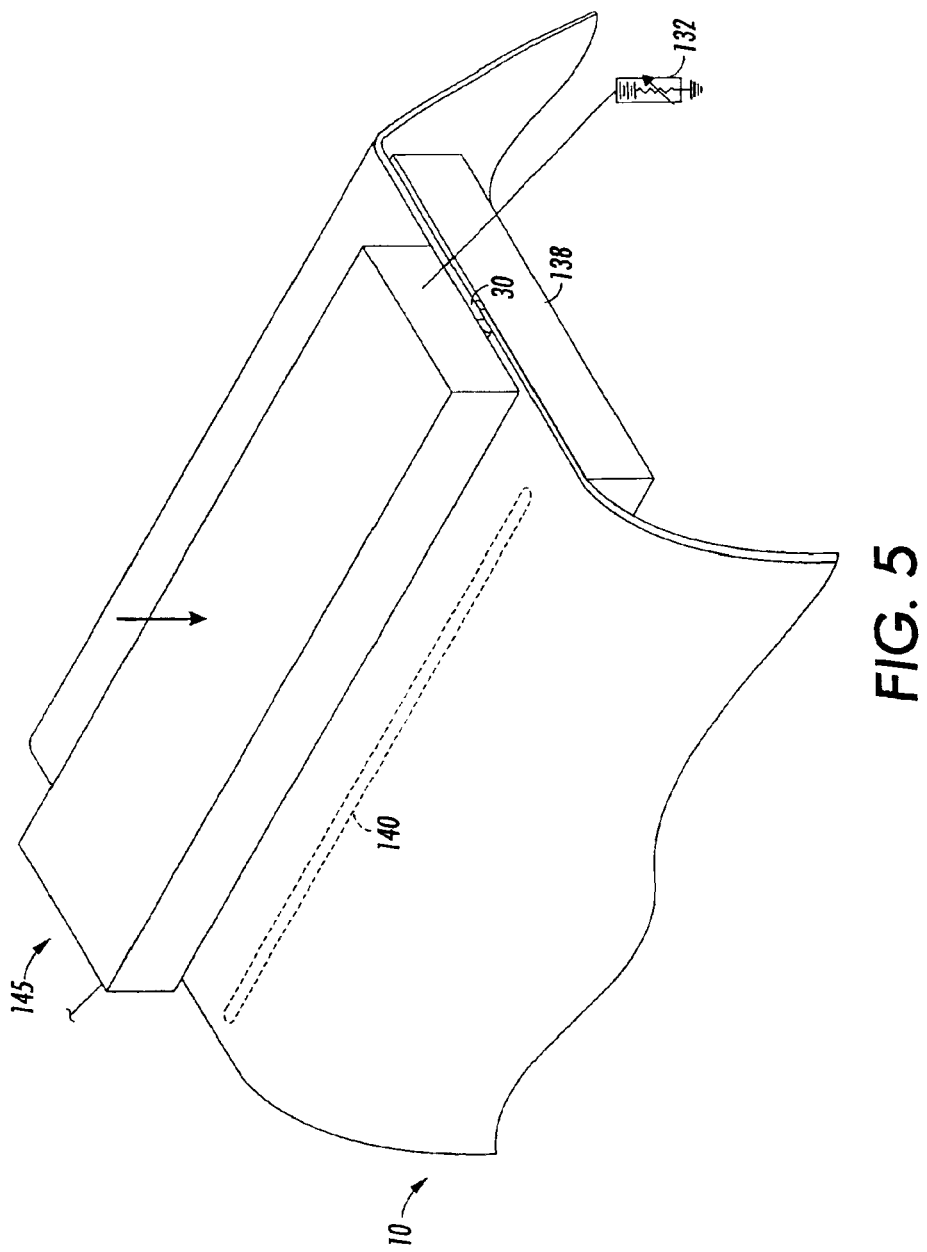
FIG. 5 is a schematic sectional side view of a seamed flexible electrophotographic imaging member belt in which the seam is held down onto the flat supporting surface of an elongated support member, with a strip laminator (not shown) positioned directly over the seam, while subjected to an elevated temperature seam overcoating/lamination process, utilizing a flat surfaced narrow heating and compression bar.

An apparatus for carrying out embodiments of the treatment method includes a heat source or heating means that heats the seam region (the area of the imaging member 10 around the seam 30) after the laminate has been placed in contact with the seam. Embodiments also include means for applying pressure to the heated region. In embodiments, as shown in FIG. 5, a hot compression bar or plate 145 is the heat source and provides localized heating and compression of the region about the seam 30, directly over which a laminator strip (not shown) has been placed, to yield seam overcoating/lamination result. Embodiments also include means to hold the seam region in place during treatment, such as a vacuum system. Thus, while the seam 30 of imaging member 10 is positioned and vacuum held down on the flat smooth supporting surface of support member 138, the heat source heats the seam region and strip. The hot compression bar 145, preferably metallic, has a smooth outer contacting surface that is coated with a thin abhesive or low surface energy coating to prevent imaging layer material and the laminator strip from adhering to its surface when seam overcoating/lamination processing is carried out. Any suitable abhesive or low surface energy material can be employed, including fluoropolymers, such as Teflon, silicone, polyimide, and the like. A thin Teflon coating on the smooth contacting surface is preferred in embodiments because it promotes ease of release and prevents imaging member material from sticking to the surface of the heating/compression bar 145 when making compression contact during seam lamination processing treatment. The efficiency of heat energy delivery from the heating/compression bar 145, preferably comprising resistance elements (not shown) temperature control, to the laminator strip and seam area during contact is adjusted by any suitable device, such as a conventional adjustable variac 132, to provide sufficient power to raise the temperature of the laminator strip and seam area from about 20° C. to 70° C. above the $T_g$ of the thermoplastic polymer material in the charge transport layer ($T_g$ of the laminate if it is lower than that of the charge transport layer) of the electrophotographic imaging member 10. This thermoplastic polymer material is the top layer of the imaging member, which is for example the charge transport layer comprising a polymer binder with dissolved or molecularly dispersed charge transport compound, of electrophotographic imaging member. Conventional thermostats can be employed to regulate the temperature of the heating/compression bar 145A narrow vacuum channel 140 can be used in embodiments on each side of the support member to vacuum hold the belt 10 down against the flat supporting surface of support member 138. The vacuum channels 140 can be about 25 millimeters apart and extend, on each side of seam 30, along the support member 138 to about the full width of the belt 10. Suitable widths for the vacuum channels can be about 60 mils (1.5 mm). The upper ends of the vacuum channels 140 are open, and the lower ends are connected by a suitable device, such as a valved flexible hose (not shown), leading to any suitable vacuum source. After belt 10 is placed onto support member 138, such as manually or by any suitable conventional robotic device, the initially closed valve on the flexible hose to the vacuum source is opened, enabling the device to suck the belt 10 against the upper, flat, smooth surface of support member 138. This suction holds the belt 10 substantially immobile on support member 138 during seam overcoating/lamination processing. If desired, embodiments can include a plurality of holes of any suitable shape (e.g. round, oval, square, and the like) instead of or in addition to the channels 140. The number and size of the holes should be sufficient to hold the belt 10 against the support member. The size of the channels and holes should be small enough to avoid distortion of the belt during the seam area heating and compression process. The resistance of the belt to distortion when suction is applied depends on the beam strength of the specific belt employed, which in turn depends upon the specific materials in and thickness of the layers in the belt 10. The support member 138 may comprise any suitable hard material. Typical materials include, for example, hard plastic, having a smooth and polished surface. Preferably, support member 138 is metallic.

In embodiments, the heating/compression bar 145 preferably has a width of between about 6 millimeters and about 30 millimeters with a length sufficient to cover the seam 30 along the entire width of the imaging member 10. In the process, heating/compression bar 145 compresses against laminator strip and seam 30 to make intimate force contact with the seam. Such intimate force contact made by heating/compression bar 145 substantially instantaneously elevates the temperature of a small localized region of the imaging layer adjacent to seam 30 of the imaging member containing thermoplastic polymer. This small localized region of the imaging layer in the upper portion of the seam region is heated substantially instantly above the $T_g$ of the thermoplastic polymer. Typically, the $T_g$ of a film forming polymer used for an electrophotographic imaging layer, e.g., the charge transport layer, is at least about 45° C. to satisfy most imaging belt machine operating conditions. The imaging layer of an imaging member is a charge transport layer if the imaging member is an electrophotographic imaging member and a dielectric layer if the imaging member is an electrographic imaging member. Since the charge transport layer of embodiments is a composite comprising a polymer binder, a dissolved or molecularly dispersed charge transport organic compound, and optional pigment particles, the $T_g$ in this case is a $T_g$ of the combination. Thus, the expression polymer material as employed herein is defined as the polymer and any other material present in an imaging layer or in the laminate. Such polymer materials used for electrophotographic imaging layer coating applications normally have a $T_g$ of at least about 45° C. to satisfy most imaging belt machine operating conditions. Preferably, the seam area heating and compression process is carried out between about 20° C. and about 70° C. above the $T_g$ of the thermoplastic polymer material of the imaging layer (e.g., charge transport layer) or the laminate (whichever one has the lower $T_g$) in order to yield strong overcoated laminate adhesion bonding onto the seam region, surface smoothing result, good physical continuity transition at the seam region, and seam region thickness reduction outcome. Occurrence of material melting, distortion, or cutting through of the seam components during heat/compression processing treatment should be avoided, because this weakens or damages the belt.

For processing a flexible imaging member having a skewed seam, the belt itself can be cocked and adjusted such that the seam is positioned, without skewing, on the flat support member 138 and under the heating/compression bar 145. Compression bar 145 contacts and compresses the laminator strip and seam 30 while the belt 10 is held down against the flat supporting surface of the support member 138 by the vacuum channels 140. During pressure contact, the heat conduction from the hot compression bar 145 heats up the seam region to the desirable temperature and the compression pressure generated by the bar facilitates the bonding of the laminate to the seam to provide surface smoothing, eliminate or minimize seam region physical discontinuity, as well as reduce seam region thickness. The compression bar 145 preferably exerts a compressive pressure of between about 70 lbs/in$^2$ (5 kg/cm$^2$) and about 770 lbs/in$^2$ (55 kg/cm$^2$) on the laminator strip and seam region in order to achieve the invention seam overcoating/lamination result. An effective temperature range used for heat treating/laminating an overcoat onto the seam of a typical flexible photoreceptor belt, comprising a top exposed charge transport layer containing a thermoplastic polycarbonate polymer and a dissolved or molecularly dispersed charge transport compound, is appropriately selected to be in a range of between about 85° C. (185° F.) and about 97° C. (206° F.), based on the fact that the charge transport layer with a thickness of about 24 micrometers has a $T_g$ of about 82° C. (180° F.). Since the preferred imaging member seam lamination treatment embodiment of this invention involves heat and pressure contact with only the seam region (a small surface area), the desired lamination treatment temperature is readily reached and cooling of the heat treated seam region to room ambient is quickly attained, the entire overcoating/lamination processing is completed within a short cycle time. Generally, the cycle time of the seam overcoating/lamination processing for the typical photoreceptor belt can be accomplished in less than about 20 seconds with the process of this invention for belts having a width of between about 20 centimeters and about 60 centimeters.

Figure 6:
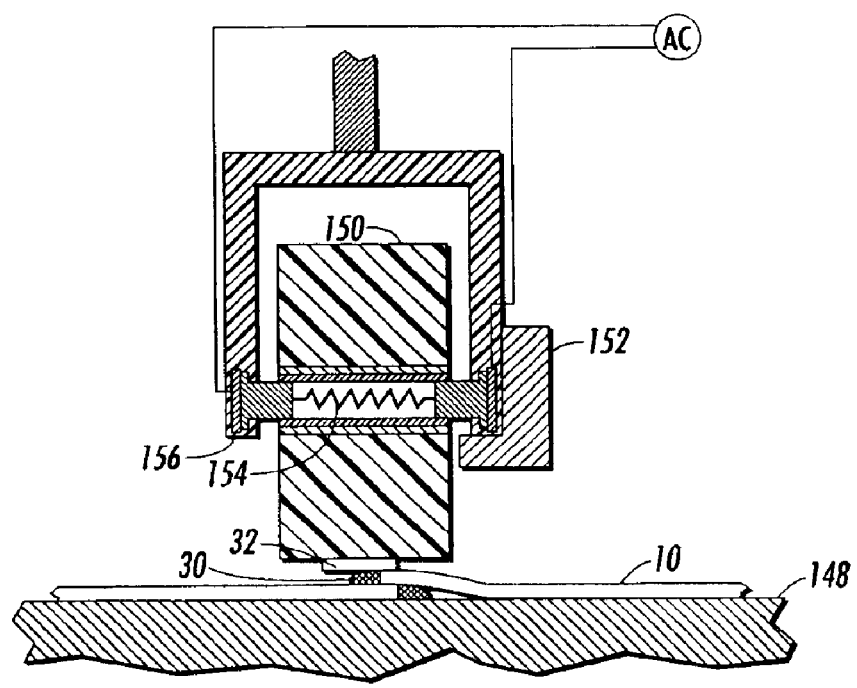
FIG. 6 shows an isometric, schematic view of a seamed flexible electrophotographic imaging member belt in which the seam is parked on, with a strip laminator placed directly over the seam, and held on a flat surface of an elongated support member while subjected to an alternative seam overcoating/lamination process, utilizing a hot rolling compression wheel.

An alternate heat source and pressure applying system usable in embodiments is illustrated in FIG. 6. A single heated, rotatable compression wheel 150 is rolled over the laminator strip 32 and seam 30 of belt 10, which is parked and held down by vacuum (not shown) on a smooth flat surface of support member 148. The geometry and design of flat support member 148 is identical to the support member 138 shown in FIG. 5. Compression wheel 150 can have a flat outer peripheral surface profile that exerts straight line compression contact against the seam to smooth the exposed surface of seam 30, eliminate protrusions, and reduce the seam region thickness. The direction of the compression force vector is perpendicular to the surface of the support member. The lower edge profile of the peripheral surface of wheel 150 is straight and substantially parallel to the smooth flat surface of the support member 148 during seam treatment. This peripheral surface should be maintained at a temperature sufficient to raise the temperature of the thermoplastic polymer material of the top layer, the imaging layer, of the belt seam to at least its glass transition temperature $T_g$. The peripheral surface of wheel 150 preferably has a thin coating surface of abhesive material to prevent imaging layer material from adhering to the peripheral surface of wheel 150 during the seam overcoating/lamination process. Any suitable abhesive material can be used. Typical low surface energy or abhesive materials include, for example, fluoropolymers, such as Teflon, silicone, polyimide, and the like. The heated compression wheel 150 is preferably metallic with a smooth peripheral surface. Heating of the wheel can be accomplished by any suitable device such as, for example, by an electromagnetic induction RF heating mechanism 152 to give the desired temperature when wheel 150 traverses the full width of belt 10 and over seam 30 to compress the seam. Alternatively, any other suitable device, such as a resistance wire heating system 154 can be employed to heat compression wheel 150. Where the resistance wire is part of the wheel, any suitable electrical connection, such as slip rings 156, can be used to provide electrical energy to the resistance wires. Sufficient heat energy should be supplied to wheel 150 to adequately heat the peripheral surface thereof. Preferably, the hot rotatable compression wheel 150 is reciprocated and the support member 148 carrying belt 10 remain stationary during the seam treatment. However, if desired, the support tube and belt can be moved and the wheel remains stationary or both can be reciprocated to achieve relative motion with each other. Wheel 150 remains rotatable and exerts a linear compression force of between about 1 lb/in. (0.18 kilograms/cm) and about 20 lbs/in. (3.6 kilograms/cm) over the laminator strip and seam region during any of the aforesaid seam treatment embodiments. Since the line force of compressive contact, generated by the continuous rolling wheel pressure action against the laminator strip 32 across the entire belt width, at least matches or is greater than the width of strip 32 at the site on the seam heated by the hot wheel 150, the compressive line of force contact is perpendicular to the seam length and of infinite numbers or continuum as the hot wheel rolls and traverses to effect full seam overcoating/lamination.

Figure 7:
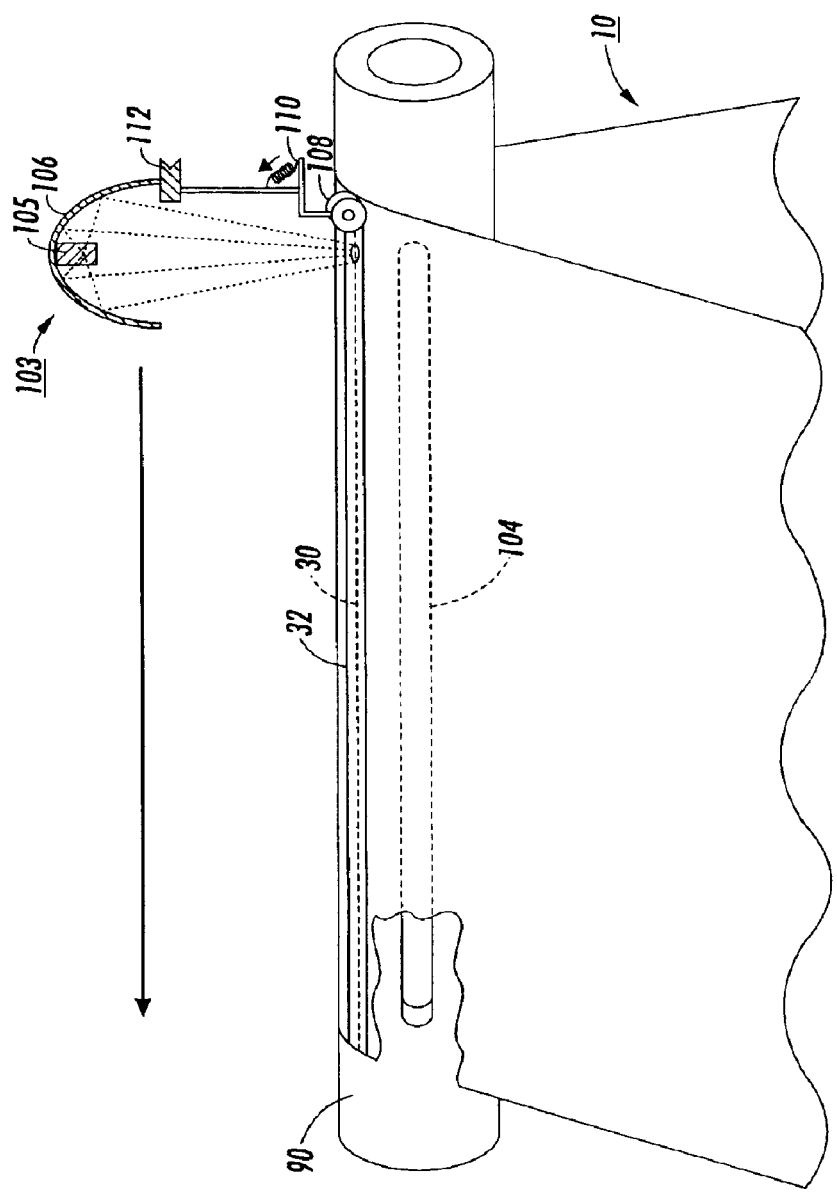
FIG. 7 is an isometric schematic view of a seamed flexible electrophotographic imaging member belt in which the seam is parked on and held against the arcuate convex surface of an elongated support member by vacuum, while heating with a focus infrared red spot and coupled with a compression rolling wheel, is subjected to the heating and compression processing of the present invention to yield seam overcoating/lamination and stress-release results.

Another heat source usable in embodiments includes infrared radiation sources. Embodiments can, for example, use incandescent lamps or high intensity discharge lamps as the heat source. Additionally, optics, such as, for example, reflectors, lenses, and filters, can be used to alter the character, path, and intensity of the output of such infrared radiation sources. An example of an infrared radiation heat source arrangement usable in embodiments is illustrated in FIG. 7. A high power tungsten halogen quartz bulb infrared (IR) is the heat source 103, and provides localized, focused IR heating. Preferably, optics are employed to create a small, substantially circular heat spot that preferably straddles the laminator strip 32 after the strip 32 is placed on the seam 30 of imaging member 10. The seam region is, for example, held down on a hollow support cylinder 90 at about the 12 o'clock position. A free rotating compression wheel 108 follows the heat spot to provide localized compression to the heated portions of the laminator strip 32 and the seam region of imaging member 10. The circular IR heat spot should have a diameter sufficient to cover, yet not to exceed, the entire width of the laminator strip 32 in order to impart an effective result. In embodiments, this width can be between about 2 mm and about 15 mm in spot diameter. Compression wheel 108, trailing right behind the IR heat spot, is biased against the laminator strip 32 (placed over the seam 30) by a spring 110 to provide the needed compression force. Both the IR heat source 103 and compression wheel 108 are supported by any suitable means 112 (partially shown), such as part of the frame of the processing device. An advantage of using a curved, convex surface is to provide seam bending stress release; the processed seam obtained according to embodiments employing such a curved surface can yield an enhanced seam cracking/delamination life extension result under normal operating conditions.

As in the previous examples, a narrow vacuum channel 104 can be used in embodiments on each side of the hollow support cylinder 90 to hold the belt 10 down against the arcuate convex surface of cylinder 90. The vacuum channels 140 can be about 180° apart and extend axially along each side of cylinder 90. Suitable widths for the vacuum channels can be about 60 mils (1.5 mm). One end of tube 90 is sealed (not shown) and the other is connected by a suitable device such as a valved flexible hose (not shown) to any suitable vacuum source. After belt 10 is placed onto the tube 90, such as manually or by any suitable conventional robotic device, the initially closed valve on the flexible hose to the vacuum source is opened, enabling the device to suck the belt 10 against the upper, arcuate, convex surface of tube 90 and to achieve a substantially 180 degree wrapping of belt 10 around the upper, arcuate, convex surface of tube 90. plugs, seals, end-caps, or the like can be used to close the end openings of supporting tube 90 to ensure vacuum buildup. This suction holds the belt 10 substantially immobile on the tube 90 during seam overcoating/lamination processing. If desired, embodiments can include a plurality of holes of any suitable shape (e.g. round, oval, square, and the like) instead of or in addition to the slots 104. The number and size of the holes should be sufficient to hold the belt 10 against the support member. The size of the slots and holes should be small enough to avoid distortion of the belt during the seam area heating and compression process. The resistance of the belt to distortion when suction is applied depends on the beam strength of the specific belt employed, which in turn depends upon the specific materials in and thickness of the layers in the belt 10.

In embodiments, the supporting cylindrical tube 90 for imaging belt 10 has an outer radius of curvature of, for example, between about 9.5 millimeters and about 50 millimeters (i.e. diameter of curvature of between about 19 millimeters and about 100 millimeters). When the radius of curvature chosen for invention seam overcoating/lamination processing is less than about 9.5 millimeters (i.e. diameter of curvature of about 19 millimeters), the beam rigidity of the electrophotographic imaging belt will raise the belt 10 bending resistance so high that only a very small curvature can be achieved prior to carrying out the treatment. When the radius of curvature is greater than about 50 millimeters (i.e. diameter of curvature of about 100 micrometers), the seam stress-release is not fully realized because little or insignificant seam bending stress-release in the imaging layer is obtained.

With reference again to FIG. 7, the electrophotographic imaging belt 10 is positioned with belt seam 30 parked directly over supporting cylindrical tube 90, so that the arcuate convex surface of tube 90 is in intimate contact with the back surface of belt 10 with the top imaging surface of belt 10 facing away from tube 90. If desired, to further assure intimate contact and conformance of the belt to the top convex surface of the tube 90 (say for instance, the belt is making an 180° wrap around the tube), a slight belt tension can be applied to the belt 10 by any suitable means such as, for example, by inserting a light weight cylindrical tube of the same outer diameter as tube 90 inside the lower loop of belt 10 while the belt 10 is hanging from tube 90.

Tube 90 can be cantilevered by securing one end to a supporting wall or frame. A desirable imaging member wrapped angle for the seam segment parking over the back supporting cylindrical tube 90 should provide an arcuate convex area at the seam region at least about as wide as the diameter of the heated substantially circular IR spot. It is preferred that the wrap angle encompassing the seam and region of the belt adjacent each side of the seam conforming to the arcuate convex supporting surface of the support member be between about 10° and about 180°. The material used for tube 90 must be very hard and nearly incompressible. It can be of any suitable material, including, for example, metal, plastic, composites, and the like, but is preferably metallic. Although the imaging member 10 is shown to be held down against the convex upper surface of the full circular support tube 90 in FIG. 7, the elongated support member may alternatively have any other suitable shape such as an elongated half circle, an elongated partial circle, a bar having an arcuate convex surface on the side contacting the seam, and the like, provided the support member employed has an arcuate convex curve surface sufficient to retain and hold down the entire length of the seam region of the parked belt during seam overcoating/lamination processing.

The IR tungsten halogen quartz bulb 105 emits a dominant radiant wavelength of about 0.98 micrometer. Preferably, at least about 80 percent of the radiation emitted by the tungsten halogen quartz bulb 105 has a radiant wavelength of about 0.98 micrometer. A typical, commercially available, high powered IR tungsten halogen quartz bulb 105 that can be used in heating source 103 is a Model 4085 infrared heating bulb, available from Research, Inc., and comprises a 750 watt tungsten halogen quartz bulb (750Q/CL, available from Research, Inc.) positioned at a focal point inside an aluminum hemi-ellipsoid shaped heat reflector 106 similar to the schematic arrangement shown in FIG. 7. This IR heating bulb 105 has an adjustable energy output to give suitable IR heat spot temperature; for example, with heat flux densities to 650 watts per square inch (1007 kilowatts per square meter) at a 6 millimeter diameter focal point of the converging infrared energy. A 500 watt tungsten halogen quartz bulb is also available form Research, Inc., and other suitable bulbs could be obtained from other manufacturers. Bulb 105 is positioned inside an hemi-ellipsoid reflector 106 at the focal point of the reflector so that all the reflected energy from bulb 105 converges at another focal point outside of the reflector 106. If the hemi-ellipsoid reflector were formed into a complete ellipsoid rather than half an ellipsoid, there would be two symmetrically positioned focal points, one where the bulb 105 is located and the other where the reflected energy from the bulb 105 converges. The reflector can be made of any suitable coated or uncoated material. Typical materials include, for example, uncoated aluminum, gold plated metal, stainless steel, silver, and the like. If desired, the reflector can contain openings to facilitate the circulation of a cooling gas. An increase in the area of the openings in the reflector will reduce the amount of reflected energy from bulb 105 that converges at another focal point outside of the reflector 106. The distance between the reflector and the outer surface of the seam is adjusted by any suitable positioning device, such as, for example, a conventional lead screw and ball device 88. Any other suitable device, such as a rod fixed to a movable carriage and sliding collar fitted with a set screw, the collar being secured to the reflector and slidable on the rod, can be used so long as a high intensity, substantially circular IR spot can be formed. The diameter of the spot is, for example, between about 2 millimeters and about 15 millimeters and covers the entire width of the laminator strip 32. This high intensity focused circular IR spot substantially instantaneously elevates the temperature of only a small localized region, sufficient enough to cover the width of the laminator strip 32 and to exceed the glass transition temperature ($T_g$) of the charge transport layer in the seam area or the laminate 34 of laminator strip 32. Typically, the $T_g$ of a film forming polymer in the formulation used for electrophotographic imaging layer coating applications is at least about 45° C. to satisfy most imaging belt machine operating conditions. Preferably, the heat exposure spot in embodiments should be between about the 20° C. and about 70° C. above the lower of the $T_g$ of the imaging layer or the laminate 32 to achieve sufficient seam overcoating/lamination and stress release results.

The IR heating source 103 is moved substantially continuously or incrementally, along and above, the laminator strip 32 and the seam 30, by manually or automatically means, such as by any suitable horizontally reciprocateable carriage system (not shown). Typical horizontally reciprocateable carriage systems include, for example, ball screw, two way acting air cylinder, lead screw and motor combination, belt or chain drive slide system, and the like. A relative speed of movement between the heating source/compression wheel assembly and the support tube 90 holding the seamed belt 10 can be from about 1 centimeter to about 20 centimeters per second with satisfactory results. A relative speed between about 2.5 centimeters and about 12.5 centimeters per second yields better results. Alternatively, if desired, the whole integral part of the IR heat source 103 with compression wheel assembly can be held stationary while the tube 90 carrying the hold-down imaging member can be set to motion, in exact but reversed manners as just described, to achieve the same processing outcome.

The rotatable compression wheel 108 illustrated in FIG. 7 can have a peripheral surface with an arcuate, concave cross section with a curvature that substantially corresponds to or is slightly larger than the predetermined curvature of the arcuate, convex, substantially semicircular cross section of the elongated surface of the upper half of the support tube 90. The wheel 108 produces a compression line pressure contact between the peripheral surface of the wheel and outer surface of the seam, augmented by tension force generated by spring 110. To produce effective invention seam area overcoating/lamination result that can yield good seam region physical continuity and an improved surface morphological profile, it is important that the peripheral surface of the compression wheel has an arcuate concave radius of curvature. Preferably, the arcuate concave radius of curvature is between about 9.5 millimeters and about 55 millimeters. The arcuate concave radius of curvature should correspond to or be slightly larger (e.g., by up to about 10 percent larger) than the convex surface radius of curvature of the support tube 90, which preferably has a convex radius of curvature of between about 9.5 millimeters and about 50 millimeters. The radius of the compression wheel 108, measured from its center of rotation or axis to the midpoint of line contact against the seam, can be, for example, between about 1/8 inch (3.2 millimeters) and about 1/2 inch (12.7 millimeters), so long as the pressure application requirements of embodiments are met. Measurement of the radius of the compression wheel 108 is analogous to measuring the radius at the waist of an hour glass, the compression wheel 108 having a cross sectional shape (taken along the axis of the hour glass) similar to that of an hour glass.

Since the heated localized site cools very quickly, a very small compression wheel radius measured at the waist allows delivery of the circular hot spot from the IR heat source 103 to the laminator strip (placed over the seam) closer to the imaginary axis of the wheel or the line of compression so that it is in tangential contact with waist of the wheel (e.g., bottom of the arcuate channel at about the 3 o'clock position of the wheel when a vertically aligned compression wheel is employed). Preferably, contact of the IR heat spot to the waist or any other part of the wheel 108 is avoided to prevent heat build up in the wheel. By positioning the focus beam of the IR close to the waist of a small radius wheel, the localized site heated by the IR heat spot is very close to the line of compressive contact exerted by the compression wheel against the laminator strip 32 from one side of the seam region to the other which, therefore, allows quick compression force application by the wheel to the localized heated spot before this hot spot cools to a temperature below the $T_g$ of heated polymer material in the localized site and thereby effecting seam overcoating/lamination result. However, the radius at the waist of the wheel should not be so small that rigidity of the compression wheel is compromised. Thus, for example, the waist radius of the compression wheel should not be so small as to cause the wheel or wheel support member to bend when it is used to apply a compression force to the seam region. The limiting waist radius of the wheel 108 is strongly dependent on the specific materials used to make the wheel. Similarly, bending resistance is also dependent on the specific materials selected for the wheel.

If desired, embodiments of the IR heat source 103 can be designed to have varying adjustable positions such that it can be tilted, inclined, or angled to allow positioning of the incident focused IR heat spot even closer to the line of compressive contact between the compression wheel 108 and the laminator strip/seam region. Since the line of compressive contact generated by the rolling compression wheel contacting the laminator strip/seam region is greater than or equal to the laminator strip width, the lines of compressive contact force generated are substantially perpendicular to the seam length and of infinite number. This achieves substantially complete seam overcoating/lamination processing with seam smoothing, stress-release, and substantial reduction of physical discontinuities of the entire seam region. Therefore, it is preferable that the line of compressive contact made by the compression wheel 108 on the laminator strip 32 form an arc of sufficient length to cover the full width of the laminator strip 32. The circumferential concave surface of the compression wheel 108 preferably generates a uniform linear compression force of, for example, between about 1 lb/in (0.18 kilograms/cm) and about 20 lbs/in (3.6 kilograms/cm) when in rolling contact with the laminator strip 32. By comparison, if a compression wheel 108 having a peripheral surface with a cross section having an infinite radius of curvature (which is essentially a straight line) is used, only point contact is achieved since support member surface is arcuate. The compression wheel 108 can be of any suitable material, including, for example, metallic, hard plastic, or composite materials having a smooth contacting surface. It is preferred that the contacting surface comprises a thin coating of low surface energy material, such as a fluoropolymer, such as Teflon, polysiloxane, a polyimide, such as Kapton, and the like.

In the event that it is required to process a flexible imaging member having a slanted seam (i.e. a seam that is an angle other than 90 degrees with each edge of belt 10), the integral part of heating source 103 and compression wheel assembly may be programmed or set to precisely track the seam when traversing the entire belt width. However, it is preferred that the belt be cocked and adjusted so that the seam is parallel to an imaginary axis of the support cylinder member (i.e., without skewing) along the top of the support cylinder member after belt mounting.

Although the IR heat source 103 is shown as a quartz halogen lamp in FIG. 7, any other suitable source of heat energy can be used as the IR heat source 103. For example, embodiments can use an IR laser, such as a sealed carbon dioxide ($CO_2$) laser, as the IR heat source 103, as is illustrated, for example, in FIG. 8. Sealed carbon dioxide ($CO_2$) lasers are commercially available, such as a Model Diamond 64 sealed carbon dioxide laser from Coherent, Inc., which is a slab laser comprising a pair of spaced apart, planar electrodes having opposed light reflecting surfaces. The spacing of the electrodes is arranged such that light will be guided in a plane perpendicular to the reflecting surfaces, while light in a plane parallel to the light reflecting surfaces is allowed to propagate in free space and is only confined by a resonator. Preferably, the lasing medium is a standard $CO_2$ lasing mixture, including, for example, helium, nitrogen, and carbon dioxide with a 3:1:1 ratio, plus the addition of five percent xenon. The gas is maintained between 50 and 110 torr and preferably on the order of about 80 torr. The gas is electrically excited by coupling a radio frequency generator between the electrodes, as is explained in the description of a typical sealed carbon dioxide laser found, for example, in U.S. Pat. No. 5,123,028, the entire disclosure of which is incorporated herein by reference. Sealed carbon dioxide lasers are also described in U.S. Pat. No. 5,353,297, U.S. Pat. No. 5,353,297, and U.S. Pat. No. 5,578,227, the entire disclosures of which are also incorporated herein by reference. While such sealed carbon dioxide lasers can produce, for example, a 150 watt beam, when used in embodiments, such lasers should be adjusted to deliver a lower output of, for example, about 6 watts for the seam heat treatment process.

Optics are employed in embodiments to treat the output of the laser. A phase shift mirror can be used to transform a laser beam with linear polarization into a beam with circular polarization. To obtain a circularly polarized beam, a phase shift mirror is positioned with an incidence angle of 45 degrees and the laser beam output with a plane of polarization parallel to the laser base is rotated 45 degrees to the plane of incidence. The resulting circularly polarized beam of heat energy is focused with a lens into a desired size on the outer surface of the seam. For example, a Melles Griot Zinc Selenide Positive Lens with focal distance of 63.5 mm (2.5 inches) can be used as the image lens. In the process of the present invention, all of the radiant energy emission from the carbon dioxide laser 103 progressively strikes localized sites encompassing the seam and regions of the imaging belt immediately adjacent the seam to deliver instant heating followed by quick cooling as the belt 10 with the supporting cylindrical 90 is traversed by the beam of heat energy from the laser heating source.

Preferably, the raw laser heat energy beam emitted from a laser has a circular cross section, but any other suitable cross sectional shape can be used to raise the temperature of a localized site along the seam. The diameter of a raw beam emitted by a laser is normally constant along the entire length of the beam. The thermal energy radiation emitted from a carbon dioxide laser is directed at the seam of the belt and the thermal energy radiation from the laser forms a localized site, such as a round spot, straddling the seam during traverse of the seam. The heated localized site, such as a round spot, on the surface of the seam preferably has an average width of between about 3 millimeters and about 25 millimeters measured in a direction perpendicular to the imaginary centerline of the seam, depending upon the particular dimensions of the seam to be treated. For example, a Model Diamond 64 sealed carbon dioxide laser from Coherent, Inc., has a circular raw heat energy beam having a diameter of about 6 millimeters. This raw laser heat energy beam will form a heated localized site or spot having a diameter of about 6 millimeters on the belt seam. If desired, the 6 millimeter spot size of the thermal energy striking the outer surface of the seam can be reduced for small seam area heating by masking the emitted raw laser heat energy beam using any suitable device, such as a metal template, to give a 3 millimeter to 6 millimeter heated localized spot size measured in a direction perpendicular to the imaginary centerline of the seam. Although the template can alter the heated localized spot shape to any suitable and desired shape such as an oval, square, rectangle, hexagon, octagon and the like, a circular heated localized site or spot is preferred. Moreover, where for example, the laser heat energy beam has a diameter of about 6 millimeters and a larger heat spot is desired on the outer surface of the belt seam, the laser beam can be defocused using any suitable device, such as a zinc selenide lens between the laser beam source and the belt seam. Thus, by varying the relative distances between the laser beam source, the lens and the belt seam, the 6 millimeter diameter laser beam can be defocused to give a larger spot having a diameter greater than about 6 millimeters and preferably less than about 25 millimeters in diameter measured in a direction perpendicular to the imaginary centerline of the seam for stress release treatment of large seam areas. If a mask is employed to change the shape of the raw laser heat energy beam or the defocused heat energy beam to form a spot shape other than round, the preferred heated localized site or spot size that straddles the seam has an average diameter between about 3 millimeters and about 25 millimeters measured in a direction perpendicular to the imaginary centerline of the seam. When the average diameter of the heated localized site measured in a direction perpendicular to the imaginary centerline of the seam is less than about 3 millimeters, the resulting stress release area is not enough to cover a seam region which has a width of about 3 millimeters from one side of the seam region to the other. When the average diameter of the heated spot is greater than about 25 millimeters, the stress release area exceeds the intended seam treatment region and extends into the electrophotographic imaging zone of the belt normally used for image formation.

Since the carbon dioxide laser delivers a constant diameter raw heat energy beam, the physical distance from the seam surface of the imaging belt to the laser is less important for the heat treatment process of this invention, as long as the intended seam heat treatment spot size is the same as the diameter of the raw laser beam or smaller than the raw laser beam by using a masking template. The carbon dioxide laser spot substantially instantaneously elevates the temperature of polymer material in only a small localized region or site of the imaging layer of the imaging member above the glass transition temperature ($T_g$). Although the thermoplastic polymer material must be heated to at least the glass transition temperature thereof, such heated polymer material need be only in the upper portion of the seam area to achieve the seam treatment objectives of this invention. However, if desired, heating of the seam region completely through the thickness or cross-section thereof can be accomplished during heating of a localized site. Elevation of the temperature of only a small localized region or site along the seam from one edge of the belt to the other to at least the glass transition temperature of the thermoplastic polymer material is accomplished progressively as the heat energy beam traverses the width of the belt along the seam.

An alternative heat source, a variation of that shown in FIG. 7, employs an elongated focused IR emitting source that can include, for example, an elongated halogen quartz tube coupled with a hemi-ellipsodal shaped cross-section elongated reflector. The elongated focused IR emitting source is positioned above the seam laminator strip and covers the entire width of the imaging member 10. The elongated focused IR source thus delivers an IR focused heating line to heat the entire laminator strip 32 and seam 30 at once. The width of the focused IR heating line should cover the width of the laminate 34 of the laminator strip 32. The heated strip and seam can then be compressed, as with a rolling wheel 108 (or a heated rolling wheel 115 according to that shown in FIG. 9), while the belt 10 is belt down over the arcuate convex surface of tube 90, to complete the seam overcoating/lamination treatment. Such a focused IR heating line can also be used in embodiments according to the process and apparatus of FIG. 6 where an externally-heated or cold compression rolling wheel 150 is used, while belt 10 is held down over the surface of flat support 148.

Figure 9:
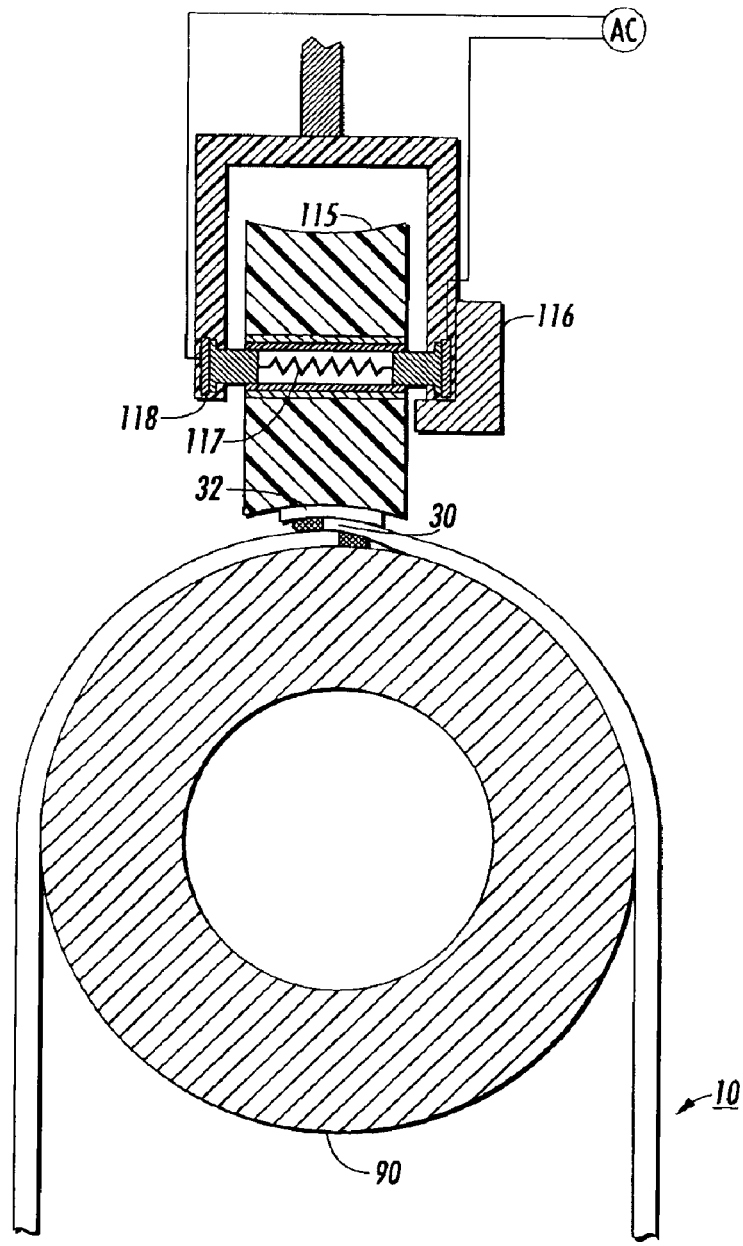
FIG. 9 shows the isometric, schematic view of a seamed flexible electrophotographic imaging member belt in which the seam is parked on and held over the arcuate convex surface of an elongated support member by vacuum while subjected to another invention variance seam overcoating/lamination processing, utilizing a hot rolling compression wheel.

FIG. 9 illustrates another alternative embodiment of seam overcoating/lamination process and apparatus similar to that shown in FIG. 7. A single, internally-heated compression wheel 115 is employed to heat and compress the seam 30 of a belt 10 situated and held down with vacuum on an elongated support tube 90. The peripheral surface of wheel 115 has an arcuate concave cross section having a curvature which corresponds to or is slightly larger than the curvature of the arcuate convex surface of the elongated surface of the upper half of support tube 90. This peripheral wheel surface should be maintained at a temperature sufficient to raise the temperature of the thermoplastic material in at least the upper half of the belt seam to its glass transition temperature $T_g$. The peripheral surface of wheel 115 also preferably has a thin coating surface of abhesive material, such as a fluoropolymer, such as Teflon, and the like to prevent imaging layer material from adhering to the wheel surface during the seam treatment process. The heated compression wheel 115 is preferably metallic with a smooth peripheral surface. Heating of the wheel can be accomplished by any suitable device such as, for example, by an electromagnetic heating mechanism 116 to give the desired temperature when wheel 115 traverses the width of belt 10 along on the seam 30. Alternatively, any other suitable device, such as a resistance wire heating system 117 can be employed to heat compression wheel 115. Where the resistance wire is part of the wheel, any suitable electrical connection such as slip rings 118 can be used to provide electrical energy to the resistance wires. Sufficient heat energy should be supplied to wheel 115 to adequately heat the peripheral surface thereof. Preferably, the hot rotatable compression wheel 115 is not reciprocated and the support tube 90 carrying belt 10 is moved during the seam treatment. However, if desired, the support tube and belt can be stationary and the wheel reciprocated or both can be reciprocated to achieve relative motion with each other.

Thus, the process and apparatus of embodiments as shown in the examples described above produce a flexible imaging member in which the seam has a protective overcoating substantially free of protrusions, a smooth surface profile, and that exhibits good physical continuity. Additionally, the seam area produced by embodiments has reduced seam area thickness and enjoys reduced fatigue induced bending seam stress cracking under dynamic belt flexing conditions over the rollers of a belt support module during imaging machine operation. Furthermore, treating according to embodiments can substantially enhance imaging member production yield, effectively reducing the belt unit manufacturing cost. Because successful implementation of embodiments greatly reduces of substantially eliminates the need of labor-intensive and time-consuming manual seam inspection procedures, embodiments also effectively increase production belt yield by recovery of those belts that are otherwise lost as rejects due to the presence of seam protrusions. Thus, embodiments deliver a seam configuration with significantly improved qualities, better physical/mechanical attributes, such as smoother surface profile, absence of protrusion spots, thinner cross-section thickness, and little or no physical discontinuity to enhance cleaning blade performance and suppress the premature onset of fatigue induced seam cracking/delamination problem during extended electrophotographic imaging and cleaning processes.

It should be noted that, though embodiments use a treatment article or strip with the thermoplastic polymer film on a carrier/support substrate, such as that shown in FIG. 4, the present invention can be performed with a treatment article or strip including a single layer of thermoplastic polymer with no carrier/support substrate. A number of examples are set forth hereinbelow and are illustrative of different compositions and conditions that can be used in practicing embodiments. All proportions are by weight unless otherwise indicated, are exemplary in nature, and are not limiting to the invention. It will be apparent that the invention can be practiced with many types of compositions and can have many different uses in accordance with the disclosure above and as pointed out hereinafter.

EXAMPLE I

Belt Preparation

An electrophotographic imaging member web was prepared by providing a roll of titanium-coated, biaxially-oriented thermoplastic polyester substrate. The substrate comprised PET, Melinex (available from ICI Americas, Inc.) and had a thickness of 3 mils (76.2 micrometers). A blocking layer with a dry thickness of 0.05 micrometer was formed on the substrate, on which an adhesive interface layer was then prepared with a dry thickness of 0.07 micrometer. The adhesive interface layer was thereafter coated with a photogenerating layer with a dry thickness of 2.0 micrometers. However, a strip about 3 mm wide along one edge of the coating web, having the blocking layer and adhesive layer, was deliberately left uncoated by any of the photogenerating layer material to facilitate adequate electrical contact with the ground strip layer that is applied later. Next, a charge transport layer and a ground strip layer were applied by co-extrusion of the coating materials. The uncoated portion of the adhesive layer was included in the application of the ground strip layer. Finally, an anti-curl coating was applied to the rear surface (side opposite the photogenerator layer and charge transport layer) of the electrophotographic imaging member web to produce a dried coating layer having a thickness of 13.5 micrometers.

The charge transport layer was prepared by introducing into an amber glass bottle in a weight ratio of 1:1 (or 50% wt of each) N,N'-diphenyl-N,N'-bis(3-methylphenyl)-1,1'-biphenyl-4,4'-diamine and Makrolon 5705, a Bisphenol A polycarbonate thermoplastic having a molecular weight of about 120,000 commercially available from Farbensabricken Bayer A.G. The resulting mixture was dissolved to give 15 percent by weight solid in methylene chloride. This solution was applied on the photogenerator layer by extrusion to form a coating which upon drying gave a thickness of 24 micrometers.

The prepared electrophotographic imaging member web had a width of 353 millimeters and was cut to provide five rectangular sheets each 559.5 millimeters in length for flexible imaging member seaming operation. The opposite ends of each imaging member were overlapped 1 mm and joined by an ultrasonic energy seam welding process using a 40 Khz horn frequency to form a seamed electrophotographic imaging member, having a top seam splashing surface morphology 74 and displaying a physical discontinuity step 72 with a junction point 76 according to the illustration in FIG. 2. Four of the five seamed belts were ready to be used for invention seam overcoating/lamination processing while one of the remaining unprocessed seamed belt was used to serve as a control.

EXAMPLE II

Treatment Article Preparation and Application
No Substrate

Six thermoplastic polymer coating solutions were prepared by dissolving Makrolon 5705 polycarbonate with varying amount of charge transport compound N,N'-diphenyll-N,N'-bis(3-methylphenyl)-1,1'-bisphenyl-4,4'-diamine in methylene chloride. The prepared solutions were each applied over a releasing substrate and dried at 257° F. (125° C.) in an air circulating oven for 5 minutes to rid the solvent and then removed from the release substrates to give thermoplastic polymer layers containing 0% wt, 10% wt, 20% wt, 30% wt, 40% wt, and 50% wt charge transport compound in each respective 25 micrometer thick layer. The thermoplastic polymer layers were each analyzed for glass transition temperature, $T_g$, using differential scanning calorimetric method. The results obtained, listed in the table below, showed that the addition of charge transport compound to the Makrolon could provide successive suppression of the $T_g$ of the resulting polymer layer:

| POLYMER LAYER | Tg (° C.) |
|---|---|
| 0% wt | 156 |
| 10% wt | 135 |
| 20% wt | 120 |
| 30% wt | 104 |
| 40% wt | 91 |
| 50% wt | 84 |

A 5 mm width strip was cut from the thermoplastic polymer layer containing 50% by weight charge transport compound (essentially identical to the charge transport layer of the electrophotographic imaging member of Example I) and placed over the top seam splash 68 (refer to seam morphology description in FIG. 2) of one welded electrophotographic imaging member of Example I, which was vacuum held down, to overcoat/laminate the seam region by heat and compression processing as that shown in FIG. 5. The compression pressure exerted by the hot compression bar was approximately 200 lbs/in$^2$ and with a temperature of about 130° C. to effect the seam overcoating/lamination outcome.

Since the processing was carried out at a temperature 46° C. above the $T_g$, the overcoat laminate became compressible as well as malleable under the applied pressure to readily fuse onto the seam and fill-up the seam step junction 76.

EXAMPLE III

Treatment Article Preparation and Application
Substrate

A coating solution, prepared by dissolving 10 grams of Makrolon in 90 grams of solvent mixture consisting of 90 parts of methylene chloride and 10 parts of toluene, was applied to a 3-mil thick, biaxially-oriented PET substrate by hand coating using a Bird applicator. The coated wet Makrolon layer was allowed to dry under room ambient conditions for 15 hours to produce a 35-micrometer thick solid polymer layer containing 60% by weight Makrolon and approximately 40% by weight toluene, with only a small amount of residual methylene chloride since toluene was much less volatile than methylene chloride. The resulting coating layer over PET substrate was cut to give an 8 mm width strip. The coating layer in this 8 mm strip was cut at both sides, through only the Makrolon layer not the PET, to remove 2 mm of Makrolon coating layer from each side to create a laminator strip 32, like that illustrated in FIG. 4, which consists of a 4 mm width thermoplastic polymer laminate 34 adhered onto an 8 mm wide flexible PET carrier substrate 36.

The fabricated laminator strip 32 was positioned over the seam of the second welded electrophotographic imaging member of Example I and then subjected to the inventive seam overcoating/lamination processing, carried out with the same procedures and apparatus as described in Example II. Since the laminate strip 34 was loosely adhered to the PET carrier substrate 36 (only about 6 grams/cm 180° peel strength), it was easily removed from the seam overcoat after completion of the heat/compression application. The resulting overcoated seam had been found to obtain about equivalent physical and morphological attribute improvements seen in the treated seam of Example II.

EXAMPLE IV

Treatment Article Preparation & Application
Solution of Example II on Substrate; IR Lamp and Wheel on Tube A laminator strip 32 was prepared, using a coating solution according to Example II and a 3-mil thick biaxially oriented PET substrate, according to the procedures described in Example III, to give a 25-micrometer thick polymer laminate 34, containing 70% by weight Makrolon and 30% by weight charge transport compound, over PET carrier substrate 36. The surface of laminate 34 of the prepared laminator strip 32 was first brushed (using a small soft paint brush) with small amount of methylene chloride to moisten the surface and thereby promote some adhesion to the seam region surface for ease of anchoring the laminator strip 32 directly onto the seam of the third welded electrophotographic imaging member of Example I, which was held down over a 2-inch diameter tube 90 as illustrated in FIG. 7. The overcoating/lamination processing used an IR heat source 103 to provide a focused, 8 mm diameter hot spot for localized heating of the laminator strip 32 to a temperature of 120° C. The hot spot was followed with a free rotating compression wheel 108 to generate an 8 lbs/in compression line for effective seam overcoating/lamination result.

The heating and compression procedures to achieve the invention seam overcoating/lamination result were carried out according to embodiments such as that illustrated in FIG. 7 and given in the preceding text of this specification. Since the laminate 34 was loosely adhered to the PET carrier substrate 36, the PET was readily peeled off from the overcoated seam after the processing.

EXAMPLE V

Treatment Article Preparation and Application
Treatment Article of Example IV; IR Laser and Wheel on Tube A laminator strip 32 was again prepared, in exact same manners described in Example IV, to give a. laminate 34 having 25 micrometers in thickness and containing 30% by weight charge transport compound over PET carrier substrate 36.

Figure 8:
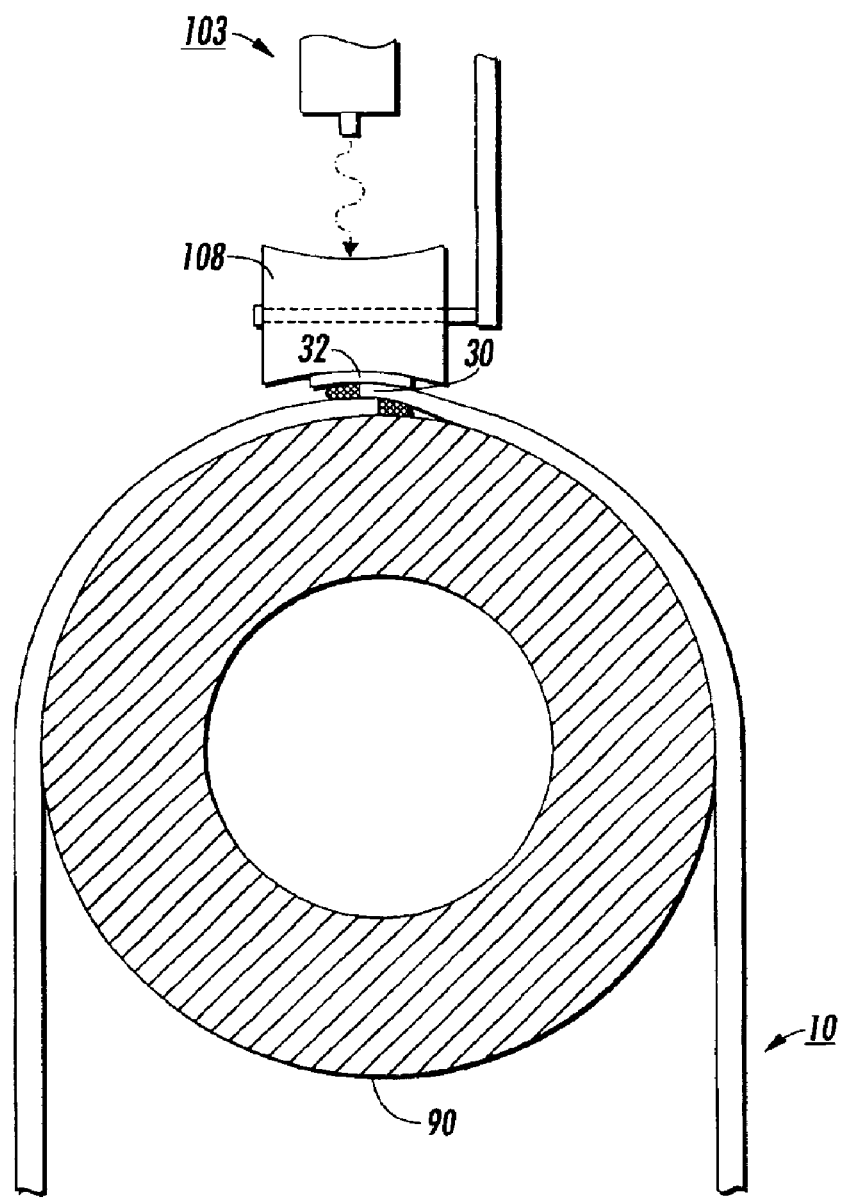
FIG. 8 illustrates the schematic, sectional side view of the seam overcoating/lamination processing arrangement of FIG. 7, but with the only exception that this exemplary embodiment used instead a $CO_2$ laser heat radiation source to replace the IR heating source shown in FIG. 7 for achieving the very same invention result.

To effect invention seam treatment processing, the fourth welded electrophotographic imaging member 10 of Example I was suspended (as shown in the illustration of FIG. 7) over a horizontally movable cantilevered supporting aluminum tube 90, having a 2-inch (5.08 centimeters) diameter, a wall thickness of about 0.25 inch (6.35 millimeters), and an anodized outer surface, with the welded seam 30 parked directly along the top (i.e. 12 o'clock position) of the support tube 10 and being parallel to the axis of the tube. The tube 10 contained a pair of slots 10, with one slot at the 9 o'clock position and the other at the 3 o'clock position. Each slot extended along the length of the imaging member width and was 2 millimeters wide. The free end of the tube 10 was sealed by a cap and the supported end was connected to a flexible hose leading through a valve to a vacuum source. The vacuum source was maintained at a pressure of about 40 mm Hg. The belt in the seam area was held down against the upper arcuate convex surface of the supporting tube when the valve to the vacuum source was opened so that the seam area conformed to the shape of the upper surface of the tube. The laminator strip 32, having the surface of the laminate 34 moistened with methylene chloride was placed directly over the seam give some adhesion hold down onto the seam region for ease of carrying out the heat/compression seam lamination process. The temperature of a localized circular spot, about 8 mm in diameter, of the laminator strip 32 and the respective covering seam region was raised to about 120° C. using a sealed carbon dioxide laser heating source 103 (Model Diamond 64, available from Coherent, Inc.) instead of the focused IR of Example IV. The laser heat source 103 had an adjacent trailing free rotating compression wheel attachment, as shown in FIG. 8, which was adjustable to deliver an about 8 lbs/cm compression line over the heat spot by spring 110, to effect the heat/compression process.

This invention seam treatment processing was then carried out according to the schematic illustration of FIG. 7. The carbon dioxide laser heating source had a 150 wattage power capability, but for the purpose of present seam treatment process, it was adjusted to deliver an energy output of only about 5.6 watts at an 8 millimeter diameter of raw laser beam spot. an infrared sensing camera was employed to adjust laser delivery of 150 Hz, 50 microsecond pulse duration, and a seam traversing speed of 2 in/s (5.08 cm/s) to ensure that the heat spot on laminator strip for seam treatment temperature reached 120° C. A spot temperature of 120° C. was sufficient to soften the laminate 34 and the charge transport layer beneath the laminate 34 for effectual application of the overcoating laminate to smooth out surface profile, fill the seam splash junction 76 to thereby eliminate the physical discontinuity, and yield seam stress-release result. The laser heat source emitted a dominant radiant wavelength of 10.64 micrometers and formed a substantially circular laser spot of about 8 mm in diameter incident over and straddling the laminator strip and seam area to provide instant heating result in the localized site to effect such heating progressing along the length of the seam, as the support tube 90 with the held down belt 10 were moved under the laser heat source/compression wheel assembly at a traversal speed of 2 in/s (5.08 cm/s) and exerting about 20 pounds of rotating wheel compression force by the spring 110 to yield a 4 mm line contact over the laminator strip and the covering seam region; accordingly, the rotating wheel generated an compression line force of about 8 lb/cm linear width. The entire seam heat/compression and overcoating/lamination processing carried out for each imaging member was completed in about seven seconds.

EXAMPLE VI

The invention seam overcoating/lamination processing carried out for the seamed electrophotographic imaging member belts described in Examples II to V was seen to give overcoat laminate that was strongly bonded to the welded seam region, since the laminate used was essentially made of the same materials and chemical components of the seam. Therefore, the end result of the seam overcoating/lamination was that the laminate was fused onto the seam area and became an integral part of the seam, which eliminated the physical discontinuity to display a tapering surface topology without the seam splash junction 76. Further seam surface roughness analysis of these seamed belts before and after treatment, using a Wyko Gauge surface analyzer, showed that the original seam splash surface roughness was significantly reduced from an average high Ra value of 6.3 to a low value of 1.6. The inventive treatment process was also found to produce a slight overall reduction in seam area thickness of up to about 10 percent.

The control electrophotographic imaging member of Example I and the four seam overcoated electrophotographic imaging members obtained through the treatment process of the present invention described by Examples II to V were each dynamically cycled and print tested in a xerographic machine, having a belt support module comprising a 25.24 mm diameter drive roller, a 25.24 mm diameter stripper roller, and a 29.48 mm diameter tension roller to exert on each belt a tension of 1.1 pounds per inch. The belt cycling speed was set at 65 prints per minute.

The control imaging member of Example I, having no seam overcoat laminate, was cyclic tested to only about 56,000 prints and terminated for the reason of developing onset of seam cracking/delamination problem.

When the very same belt cycling procedure was repeated with each of the imaging members through the process of the present invention, neither seam failure nor notable ripple appearance in the image zones were observed after completion of 500,000 prints of belt cyclic testing. Further, minimal cleaning blade wear was observed after completion of 500,000 prints of belt cyclic testing.

In recapitulation, the seam overcoating/lamination process of the present invention resolves seam cracking/delamination problems, provides a very short treatment processing cycle time, substantially eliminates seam splash junction physical discontinuity, substantially prevents the appearance of ripples in the imaging zones adjacent to the seam heat treatment area, provides smoother surface profiles, produces dimensionally stable imaging members, suppresses cleaning blade wear, and yields a processed seam substantially free of high protrusion spots to thereby reduce seamed imaging member rejection rates, which increases imaging member production yield.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A flexible belt seam treatment apparatus comprising:
   a support element with a smooth surface arranged to support a belt seam region;
   a belt hold system that holds the belt seam region against the support element;
   a treatment strip; and
      a heated pressure element arranged to heat and force the treatment strip against the belt seam region and both the treatment strip and the belt seam region toward the support element.

2. The apparatus of claim 1 wherein the smooth surface supporting the belt is substantially flat.

3. The apparatus of claim 1 wherein the smooth surface comprises an abhesive coating.

4. The apparatus of claim 3 wherein the abhesive coating comprises a fluoropolymer.

5. The apparatus of claim 1 wherein the heated pressure element comprises a heated pressure bar.

6. The apparatus of claim 5 wherein the heated pressure bar exerts from about 70 lbs/in$^2$ to about 770 lbs/in$^2$ compression force.

7. The apparatus of claim 1 wherein the heated pressure element comprises a heated pressure wheel.

8. The apparatus of claim 7 wherein the heated pressure wheel exerts from about 1 lb/in to about 20 lb/in line contact force.

9. The apparatus of claim 1 wherein the heated pressure element includes a resistance heating element.

10. The apparatus of claim 1 wherein the heated pressure element is heated by electromagnetic induction.

11. The apparatus of claim 1 wherein a surface of the heated pressure element includes an abhesive coating.

12. A flexible belt seam treatment apparatus comprising:
    a tube with a smooth outer surface;
    a belt hold system arranged to hold a seam region of a belt against at least a portion of the outer surface of the tube; and
    a heated pressure element with a substantially concave outer surface substantially corresponding to a curvature of the at least a portion of the outer surface of the tube against which the seam region of the belt is held.

13. The apparatus of claim 12 wherein the heated pressure element is a heated pressure wheel and the apparatus further comprises an actuator that moves the heated pressure wheel across a width of the seam region.

14. The apparatus of claim 12 wherein the heated pressure element is a heated pressure bar that selectively engages an entire width of the seam region and the apparatus further comprises an actuator that moves the heated pressure bar into engagement with the seam region when the seam region is held against the tube.

15. The apparatus of claim 12 wherein the belt hold system comprises a vacuum system including at least one opening in the outer surface of the tube, a sealed end of the tube, and an unsealed end of the tube in selective fluid communication with a vacuum source.

* * * * *